US011349971B2

(12) United States Patent
Yang et al.

(10) Patent No.: US 11,349,971 B2
(45) Date of Patent: May 31, 2022

(54) MOBILE TERMINAL AND MOBILE PHONE

(71) Applicant: GUANGDONG OPPO MOBILE TELECOMMUNICATIONS CORP., LTD., Guangdong (CN)

(72) Inventors: Zimei Yang, Guangdong (CN); Maozhao Huang, Guangdong (CN); Mingren Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/933,475

(22) Filed: Jul. 20, 2020

(65) Prior Publication Data

US 2020/0351394 A1 Nov. 5, 2020

Related U.S. Application Data

(63) Continuation-in-part of application No. PCT/CN2019/083869, filed on Apr. 23, 2019.

(30) Foreign Application Priority Data

Apr. 28, 2018 (CN) .......................... 201810399067.5
Apr. 28, 2018 (CN) .......................... 201820640787.1

(51) Int. Cl.
*H04M 1/00* (2006.01)
*H04M 1/02* (2006.01)

(52) U.S. Cl.
CPC ....... *H04M 1/0237* (2013.01); *H04M 1/0262* (2013.01); *H04M 1/0264* (2013.01); *H04M 1/0266* (2013.01)

(58) Field of Classification Search
CPC ............. H04M 1/0237; H04M 1/0262; H04M 1/0264; H04M 1/0266; H04M 2001/0204
See application file for complete search history.

(56) References Cited

U.S. PATENT DOCUMENTS

| | | | | |
|---|---|---|---|---|
| 8,504,122 | B2 * | 8/2013 | Tsuchiya | H04M 1/73 |
| | | | | 455/574 |
| 9,264,896 | B2 * | 2/2016 | Ying | H04W 12/04 |

(Continued)

FOREIGN PATENT DOCUMENTS

| CN | 202856839 U | 4/2013 |
|---|---|---|
| CN | 104506687 A | 4/2015 |

(Continued)

OTHER PUBLICATIONS

European Search Report for EP Application 19793401.1 dated Feb. 12, 2021. (9 pages).

(Continued)

*Primary Examiner* — Nhan T Le
(74) *Attorney, Agent, or Firm* — Young Basile Hanlon & MacFarlane, P.C.

(57) ABSTRACT

A mobile terminal includes a hand-held portion and a host portion. The hand-held portion includes a first communication module, a first power supply module and a display screen. The host portion includes a camera module, a second communication module, a third communication module, and a second power supply module. The third communication module is configured to be in a communication connection with an external apparatus. The host portion has a first installation slot. The hand-held portion can be installed in the first installation slot. The hand-held portion can be detached from the host portion. The second communication module can be in a communication connection with the first communication module after the hand-held portion has been detached from the host portion.

20 Claims, 19 Drawing Sheets

(56) References Cited

U.S. PATENT DOCUMENTS

| | | |
|---|---|---|
| 2006/0205447 A1 | 9/2006 | Park et al. |
| 2008/0026803 A1 | 1/2008 | Demuynck |
| 2016/0112552 A1 | 4/2016 | Kim et al. |

FOREIGN PATENT DOCUMENTS

| | | |
|---|---|---|
| CN | 205389228 U | 7/2016 |
| CN | 206835162 U | 1/2018 |
| CN | 107770316 A | 3/2018 |
| CN | 107920144 A | 4/2018 |
| CN | 208401903 U | 1/2019 |
| JP | 2003209603 A | 7/2003 |
| JP | 2005229349 A | 8/2005 |
| KR | 100700597 B1 | 3/2007 |
| WO | 2013102687 A1 | 7/2013 |

OTHER PUBLICATIONS

International search report for PCT/CN2019/083869, dated Jul. 5, 2019 (3 pages).
Ndian Examination Report for IN Application 202017031309 dated Aug. 2, 2021. (6 pages).

* cited by examiner

MOBILE TERMINAL AND MOBILE PHONE

CROSS-REFERENCE TO RELATED APPLICATION(S)

The present application is a continuation-in-part of International (PCT) Patent Application No. PCT/CN2019/083869, filed on Apr. 23, 2019, which claims priorities to Chinese Patent Application No. 201810399067.5, filed on Apr. 28, 2019, and Chinese Patent Application No. 201820640787.1, filed on Apr. 28, 2019, the entire contents of all of which are hereby incorporated by reference in their entireties.

TECHNICAL FIELD

The present disclosure relates to the technical field of a mobile terminal, in particular to a mobile terminal and a mobile phone.

BACKGROUND

The trend of lightness and thinness of mobile terminals such as mobile phones is becoming more and more obvious, and the consumers have more and more performance requirements for mobile phones. However, lightness and thinness requirement and performance requirement restrict each other in some degree, which makes the design of traditional mobile terminals encounter a bottleneck.

SUMMARY

Therefore, it is necessary to provide a mobile terminal and mobile phone.

A mobile terminal comprises a hand-held portion and a host portion. The hand-held portion comprises a first communication module, a first power supply module, and a display screen. The first power supply module is configured to be electrically connected to the first communication module and the display screen. The host portion comprises a camera module, a second communication module, a third communication module, and a second power supply module. The second power supply module is configured to be electrically connected to the camera module, the second communication module, and the third communication module. The third communication module is configured for communication with an external equipment. The host portion has a front surface, a back surface opposite to the front surface, and a side surface connecting the front surface and the back surface. The front surface is provided with a first installation slot, and the back surface is provided with a second installation slot. A portion of the front surface is used as a light incident surface for the camera module and allows light from environment to pass through and enter the camera module. The hand-held portion is not only configured to be installed in the first installation slot, but also configured to be installed in the second installation slot. The hand-held portion is detachable from the host portion, after the hand-held portion is detached from the host portion, the second communication module can be communicated with the first communication module.

A mobile phone comprises a hand-held portion and a host portion. The hand-held portion comprises a first communication module, a first power supply module and a display screen. The first power supply module is configured to supply power for the first communication module and the display screen. The host portion comprises a second communication module, a third communication module, and a second power supply module. The second power supply module is configured to supply power for the second communication module and the third communication module. The third communication module is configured for communication with an external equipment. The host portion has a front surface, a back surface opposite to the front surface, and a side surface connecting the front surface and the back surface. The front surface is provided with a first installation slot, and the back surface is provided with a second installation slot. The hand-held portion is not only configured to be installed in the first installation slot, but also configured to be installed in the second installation slot. The hand-held portion is detachable from the host portion, after the hand-held portion is detached from the host portion, the second communication module can be communicated with the first communication module.

An electronic device comprises a hand-held terminal and a host terminal. The hand-held terminal comprises a first communication module, a first power supply module, and a display screen. The host terminal comprises a second communication module, a third communication module, and a second power supply module. The second communication module is configured for communication with the first communication module. The third communication module is configured for communication with an external equipment. The host terminal defines an installation slot. The hand-held terminal is installed in and detachable from the installation slot. When the hand-held terminal is separated from the host terminal, the second communication module can be communicated with the first communication terminal.

BRIEF DESCRIPTION OF DRAWINGS

In order to explain the technical solutions of the embodiments of the disclosure or the related art more clearly, the following will give a brief introduction to the drawings needed in the embodiments or the related art. It is obvious that the drawings in the following description are only some embodiments of the disclosure. For those skilled in the art, without any creative work, they can also obtain drawings of other embodiments according to the following drawings.

DETAILED DESCRIPTION

Figure 1:
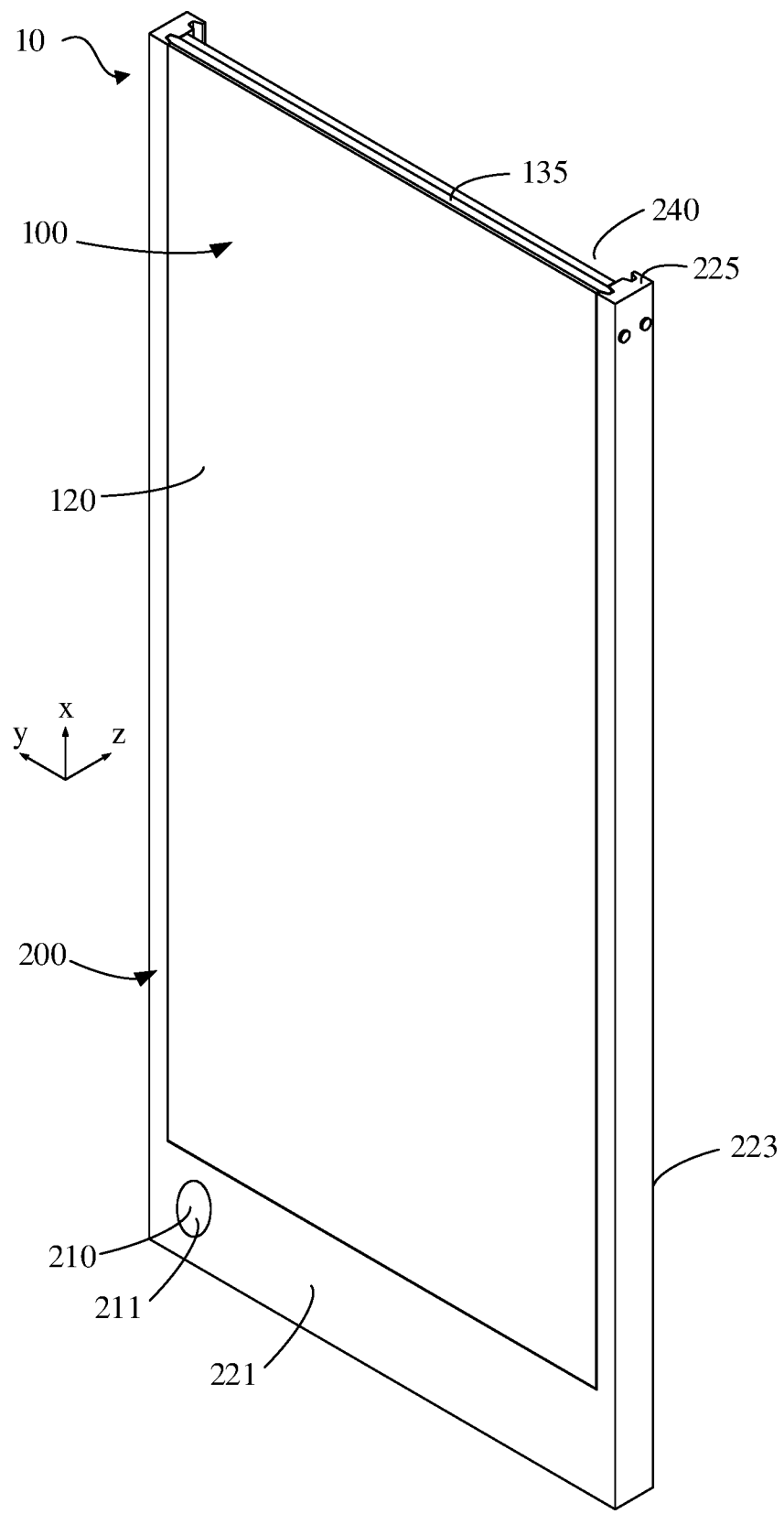
FIG. 1 is a stereogram along one view of a mobile terminal in one embodiment.

In order to facilitate the understanding of the disclosure, a more comprehensive description of the disclosure will be given below by accompanying the drawings. Preferred embodiments of the disclosure are given by the drawings. However, the disclosure can be implemented in many different ways and is not limited to the embodiments described herein. On the contrary, the purpose of providing these embodiments is to make the understanding of the disclosure more thorough and comprehensive.

The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one. Unless otherwise defined, all technical and scientific terms used herein have the same meaning as a skilled person in the art would understand. The terminology used in the description of the present disclosure is for the purpose of describing particular embodiments and is not intended to limit the disclosure.

"Terminal equipment" as used herein refers to devices capable of receiving and/or transmitting communication signals by connecting via any one or more than one of the following connection modes.

(1) Connection via wired line, such as public switched telephone networks (PSTN), digital subscriber line (DSL), digital cable, or direct cable.

(2) Through wireless interface, such as cellular network, wireless local area network (WLAN), digital TV network such as DVB-H network, satellite network, AM-FM broadcast transmitter.

The terminal equipment, configured to communicate through a wireless interface, may be named as a "mobile terminal." Examples of mobile terminals include, but are not limited to, the following electronic devices.

(1) Satellite telephone or cellular telephone.

(2) Personal communications system (PCS) terminals that can combine functions such as cellular radiotelephony and data processing, fax, and data communication.

(3) Radiophone, pager, Internet/intranet access, web browser, notebook, calendar, personal digital assistant (PDA) with global positioning system (GPS) receiver.

(4) Conventional laptop and/or palmtop receivers.

(5) Conventional laptop and/or palmtop radiotelephone transceivers, etc.

A mobile terminal comprises a hand-held portion and a host portion. The hand-held portion comprises a first communication module, a first power supply module, and a display screen. The first power supply module is configured to be electrically connected to the first communication module and the display screen. The host portion comprises a camera module, a second communication module, a third communication module, and a second power supply module. The second power supply module is configured to be electrically connected to the camera module, the second communication module, and the third communication module. The third communication module is configured for communication with an external equipment. The host portion has a front surface, a back surface opposite to the front surface, and a side surface connecting the front surface and the back surface. The front surface is provided with a first installation slot, and the back surface is provided with a second installation slot. A portion of the front surface is used as a light incident surface for the camera module and allows light from environment to pass through and enter the camera module. The hand-held portion is not only configured to be installed in the first installation slot, but also configured to be installed in the second installation slot. The hand-held portion is detachable from the host portion, after the hand-held portion is detached from the host portion, the second communication module can be communicated with the first communication module.

In one embodiment, the host portion comprises a U-shaped frame and defines an opening; the hand-held portion not only can be installed in the first installation slot, but also can be installed in the second installation slot from the opening, so that the orientation of the display screen is same as or opposite to that of the light incident surface.

In one embodiment, the host portion comprises a frame which defines the first installation slot and the second installation slot, and a baffle plate located in the frame and parallel to and spaced from the front surface and the back surface; the first installation slot and the second installation slot are isolated by the baffle plate.

In one embodiment, the hand-held portion can be installed into the first installation slot from the side of the front surface, so that the orientation of the display screen is the same as that of the light incident surface; the hand-held portion can also be installed into the second installation slot from the side of the back surface, so that the orientation of the display screen is opposite to that of the light incident surface.

In one embodiment, the hand-held portion can be installed into the first installation slot from the side of the side surface, so that the orientation of the display screen is same as that of the light incident surface; the hand-held portion can also be installed into the second installation slot from the side of the side surface.

In one embodiment, the hand-held portion can be installed into the first installation slot from the side of the side surface, so that the orientation of the display screen is opposite to that of the light incident surface; the hand-held portion can also be installed into the second installation slot from the side of the side surface.

In one embodiment, the hand-held portion comprises a front end surface, a back end surface, and a side end surface connecting the front end surface and the back end surface; the display screen is located on the front end surface; the hand-held portion can be installed into the first installation slot from the side of the front end surface or from the side of the back end surface.

In one embodiment, the first installation slot and the second installation slot are communicated so that the host portion is hollow structure.

In one embodiment, each of two opposite side walls of the first installation slot is provided with a groove, the groove extends along the length direction of the host portion; an edge of the hand-held portion is provided with a guide rail matchable to the groove, and the guide rail is configured to be accommodated in the groove.

In one embodiment, further comprising an elastic unit connected to the host portion, the elastic unit protrudes out of the groove; when the hand-held portion is installed into the first installation slot, the elastic unit is configured to hold the guide rail.

In one embodiment, the elastic unit comprises a threaded fastener and an elastic member; the threaded fastener is connected to the host portion by thread, the threaded fastener is provided with a mounting hole, one end of the elastic member is accommodated in the mounting hole, and the other end of the elastic member is protruded out of the groove.

In one embodiment, the mobile terminal further comprises a plurality of elastic units; along a width direction of the host portion, at least one of the plurality of elastic units is located on one side of the host portion, and the rest of the plurality of elastic units are located on the other side of the host portion.

In one embodiment, the first power supply module comprises a nuclear battery, the nuclear battery is configured to be electrically connected to the first communication module and the display screen.

In one embodiment, the first communication module and the second communication module are both Bluetooth communication modules, or both are WiFi communication modules, or both are ZigBee communication modules, or both are NFC communication modules.

In one embodiment, the hand-held portion is also provided with a charging interface, a side wall of at least one of the first installation slot and the second installation slot is provided with a discharging interface corresponding to the charging interface, and the host portion is configured to charge the hand-held portion through the discharging interface and the charging interface.

A mobile phone comprises a hand-held portion and a host portion. The hand-held portion comprises a first communication module, a first power supply module and a display screen. The first power supply module is configured to supply power for the first communication module and the display screen. The host portion comprises a second communication module, a third communication module, and a second power supply module. The second power supply module is configured to supply power for the second communication module and the third communication module. The third communication module is configured for communication with an external equipment. The host portion has a front surface, a back surface opposite to the front surface, and a side surface connecting the front surface and the back surface. The front surface is provided with a first installation slot, and the back surface is provided with a second installation slot. The hand-held portion is configured to be installed in the first installation slot or in the second installation slot. The hand-held portion is detachable from the host portion, after the hand-held portion is detached from the host portion, the second communication module can be communicated with the first communication module.

In one embodiment, the host portion comprises a camera module, and light from the environment can enter the camera module from the side of the front surface.

In one embodiment, the hand-held portion can be installed into the first installation slot from the side of the front surface, so that the orientation of the display screen is the same as that of the front surface; the hand-held portion can also be installed into the second installation slot from the side of the back surface, so that the orientation of the display screen is same as that of the back surface.

In one embodiment, the hand-held portion can be installed into the first installation slot from the side of the side surface, so that the orientation of the display screen is same as or opposite to that of the front surface; the hand-held portion can also be installed into the second installation slot from the side of the side surface.

In one embodiment, the hand-held portion comprises a front end surface, a back end surface, and a side end surface connecting the front end surface and the back end surface; the orientation of a display area of the display screen is same as or opposite to that of the front surface; the hand-held portion can be installed into the first installation slot from the side of the front end surface or from the side of the back end surface.

In one embodiment, each of two opposite side walls of the first installation slot is provided with a groove, an edge of the hand-held portion is provided with a guide rail matchable to the groove; the mobile phone further comprises an elastic unit, the elastic unit is located in and protrudes out of the groove; when the hand-held portion is installed into the first installation slot, the guide rail is received in the groove, and the elastic unit in configured to hold the guide rail.

In one embodiment, the elastic unit comprises a threaded fastener and an elastic member; the threaded fastener is connected to the host portion by thread, and the threaded fastener is provided with a mounting hole; one end of the elastic member is accommodated in the mounting hole, and the other end of the elastic member is protruded into the groove.

A mobile phone comprises a hand-held portion and a host portion. The hand-held portion comprises a first power supply module and a display screen. The first power supply module is configured to supply power to the display screen. The host portion comprising a second power supply module. The host portion has a front surface and a back surface opposite to each other, and a side surface connecting and between the front surface and the back surface. The front surface is provided with a first installation slot, and the back surface is provided with a second installation slot. The hand-held portion is configured to be installed in the first installation slot or in the second installation slot, and the hand-held portion is detachable from the host portion. The hand-held portion can communicate and connect with the host portion after the hand-held portion is detached from the host portion. The hand-held portion comprises a sub machine keyboard, a sub machine main controller, and a sub machine wireless transceiver module. The first power supply module is configured to supply power for the sub machine keyboard, the sub machine main controller and the second wireless transceiver module. The host portion comprises a wireless modulation and demodulation module, a host main controller, and the host wireless transceiver module. The second power supply module is configured to supply power for the wireless modulation and demodulation module, the host main controller and the host wireless transceiver module. In a first working state of the mobile phone, a control command output by the sub machine keyboard, under the control of the sub machine main controller, is modulated by the sub machine wireless transceiver module and sent to the host wireless transceiver module; under the control of the host main controller, the control command is modulated by the wireless modulation and demodulation module and sent to the air; signal of the control command from the air, after being demodulated by the wireless modulation and demodulation module, is sent to the hand-held portion after being modulated by the host wireless transceiver module through the host main controller; after being received by the sub machine wireless transceiver module, the control command is displayed by the display screen under the control of the sub machine main controller.

A mobile phone comprising: a hand-held portion and a host portion. The hand-held portion comprises a first power supply module and a display screen. The first power supply module is configured to supply power to the display screen. The host portion comprises a second power supply module, the host portion has a front surface and a back surface opposite to each other, and a side surface connecting and between the front surface and the back surface. The front surface is provided with a first installation slot, and the back surface is provided with a second installation slot. The hand-held portion is configured to be installed in the first installation slot or in the second installation slot, and the hand-held portion is detachable from the host portion. The hand-held portion can communicate and connect with the host portion after the hand-held portion is detached from the host portion. The hand-held portion comprises a sub machine main controller, a sub machine microphone, a sub machine telephone receiver, a sub machine audio encoder, an sub machine audio decoder, and a sub machine wireless transceiver module capable of communicating with the host wireless transceiver module. The first power supply module is configured to supply power for the sub machine main controller, the sub machine microphone, the sub machine telephone receiver, the sub machine audio encoder, the sub machine audio decoder, and the sub machine wireless transceiver module. The host portion comprises a wireless modulation and demodulation module, a host main controller, a host wireless transceiver module. The second power supply module is configured to supply power for the wireless modulation and demodulation module, the host main controller, and the host wireless transceiver module. In a second working state, the audio signal from the sub machine microphone is encoded by the sub machine audio encoder and transmitted to the sub machine main controller; under the control of the sub machine main controller, the audio signal is sent by the sub machine wireless transceiver module, and received by the host wireless transceiver module; under the control of the host main controller, the audio signal is transmitted to the wireless modulation and demodulation module, modulated by the wireless modulation and demodulation module, and sent to the air; signal from the air is demodulated by the wireless modulation and demodulation module and transmitted to the host main controller; under the control of the host main controller, the signal is transmitted to the host wireless transceiver module; after being modulated by the host wireless transceiver module, the signal is sent to the hand-held portion; the audio signal is demodulated by the sub machine wireless transceiver module, decoded by the sub machine audio decoder under the control of the sub machine main controller, and output by sub machine telephone receiver.

An electronic device comprises a hand-held terminal and a host terminal. The hand-held terminal comprises a first communication module, a first power supply module, and a display screen. The host terminal comprises a second communication module, a third communication module, and a second power supply module. The second communication module is configured for communication with the first communication module. The third communication module is configured for communication with an external equipment. The host terminal defines an installation slot. The hand-held terminal is installed in and detachable from the installation slot. When the hand-held terminal is separated from the host terminal, the second communication module can be communicated with the first communication terminal.

Figure 2:
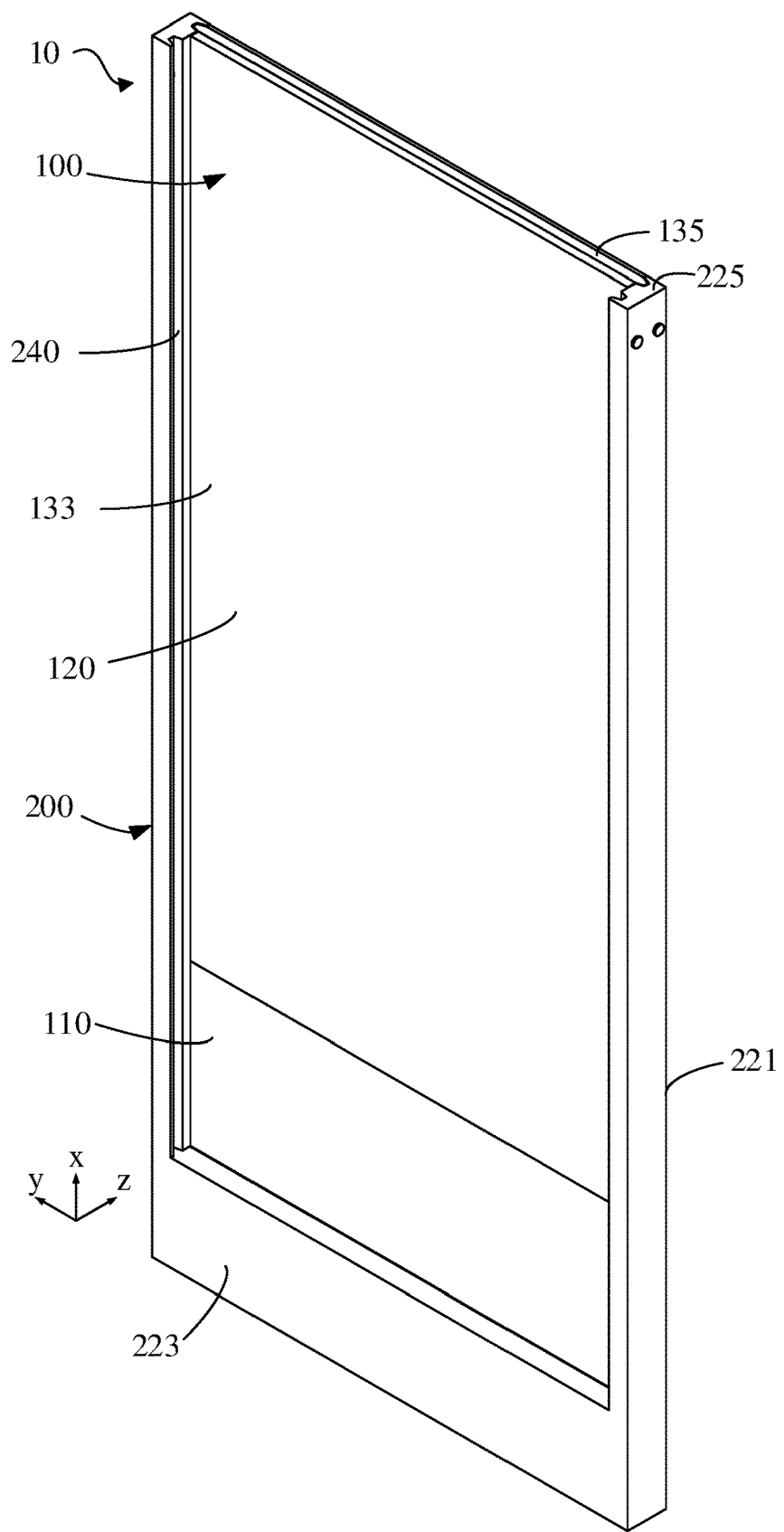
FIG. 2 is a stereogram along another view of the mobile terminal shown in FIG. 1.
Figure 3:
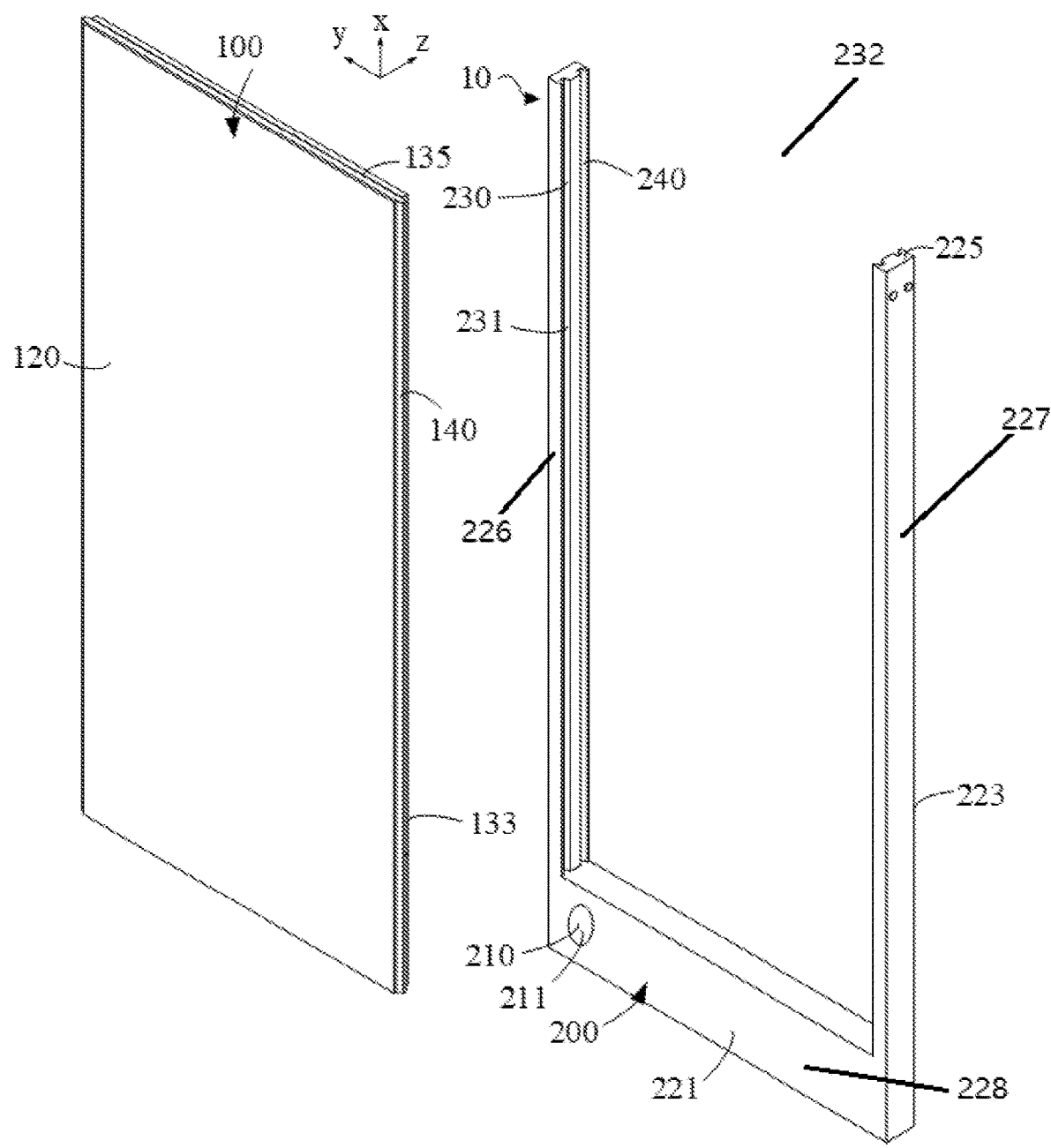
FIG. 3 is an exploded view of the mobile terminal shown in FIG. 1.

As illustrated in FIGS. 1 to 3, in one embodiment, the mobile terminal 10 is a smart phone. The mobile terminal 10 includes a hand-held portion 100 and a host portion 200 which can be used separately. The hand-held portion 100 includes a first communication module, a first power supply module 110, and a display screen 120. The first power supply module 110 can be electrically connected to the first communication module and the display screen 120, and the first power supply module 110 is configured to supply power for the first communication module and the display screen 120. The display screen 120 can be used to display information, and the display screen 120 can also be used to provide an interactive interface for the user to interact with the hand-held portion 100, for example, to realize touch operation. The host portion 200 includes a camera module 210, a second communication module, a third communication module, and a second power supply module. The second power supply module can be electrically connected to the camera module 210, the second communication module, and the third communication module, and the second power supply module is configured to supply power for the camera module 210, the second communication module, and the third communication module. The third communication module is used for communication with external equipments such as base stations or other terminals. In one embodiment, the host portion 200 includes a front surface 221, a back surface 223 opposite to the front surface 221, and a side surface 225 located between and connecting to the front surface 221 and the back surface 223, the front surface 221 is provided with a first installation slot 230, and the back surface 223 is provided with a second installation slot 240. A portion of the front surface 221 is used as a light incident surface 211c for the camera module 210 and allows light from environment to pass through and enter the camera module 210. The light can pass through the light incident surface 211 and be incident on the sensing element of the camera module 210. The hand-held portion 100 can be not only installed in the first installation slot 230, but also the second installation slot 240. When the hand-held portion 100 is installed in the first installation slot 230 or the second installation slot 240, the hand-held portion 100 and the host portion 200 are combined to form the mobile terminal 10, and the mobile terminal 10 can be operated normally. The hand-held portion 100 can also be detached from the host portion 200. When the hand-held portion 100 is detached from the host portion 200, the second communication module can still communicate with the first communication module to realize the data transmission between the hand-held portion 100 and the host portion 200, and the hand-held portion 100 can still play the functions such as display, touch operation, so that the mobile terminal 10 can be operated normally by the user.

In one embodiment, the hand-held portion 100 is free of processor and camera module, and the host portion 200 is free of display screen. In one embodiment, the hand-held portion 100 consists of the first communication module, the first power supply module 110, the display screen 120, and a first shell for accommodating the first communication module, the first power supply module 110, the display screen 120; the host portion 200 consists of the camera module 210, the second communication module, the third communication module, the second power supply module, a processor, and a second shell for accommodating the camera module 210, the second communication module, the third communication module, the second power supply module and the processor. The second shell is a frame having a wall defining a room for accommodating the camera module 210, the second communication module, the third communication module, the second power supply module and the processor.

The first power supply module 110 may include a nuclear battery, such as a tritium battery, which is small in size, relatively light and thin, and has a long service life. The nuclear battery can provide power for the display screen 120, the first communication module, and other electronic components of the hand-held portion 100 for a long time, thereby facilitating the lightweight of the hand-held portion 100. In one embodiment, the first power supply module 110 may also include a lithium battery or the like, and the first power supply module 110 may repeatedly charge and discharge for many times to provide power for the display screen 120 and other electronic components of the hand-held portion 100. The function provided by the hand-held portion 100 can be relatively simple, so that the number of electronic components of the hand-held portion 100 is less, which is conducive to extending the endurance of the hand-held portion 100. In one embodiment, the second power supply module can include a lithium battery which can be repeatedly charged and discharged, and the second power supply module can provide power for the camera module 210, the second communication module, and the third communication module.

Both the first communication module and the second communication module adopt the short distance communication technology, and the first communication module and the second communication module adopt the same communication protocol. For example, the first communication module and the second communication module can both be Bluetooth communication module, or both are Wireless Fidelity (WiFi) communication module, or both are infrared data association (IrDA) module, or both are ZigBee communication module, or both are ultra wideband communication module, or both are near field communication (NFC) module. The communication connection between the first communication module and the second communication module can realize the data transmission between the hand-held portion 100 and the host portion 200. The data transmitted from the host portion 200 to the hand-held portion 100 can be further converted into signal for display, touch control and other signals, and the data transmitted from the hand-held portion 100 to the host portion 200 can be stored or processed. In other embodiments, the hand-held portion 100 may also include an audio output module for outputting sound, or an image capturing device for video recording and picture shooting, etc., which will not be discussed in detail here. The host portion 200 can also be provided with an audio output module and the like.

For the mobile terminal 10 above, the hand-held portion 100 includes a display screen 120, a first communication module, and a first power supply module 110. The first communication module can communicate with the second communication module of the host portion 200. The hand-held portion 100 can be separated from the host portion 200. After the hand-held portion 100 is separated from the host portion 200, and the hand-held portion 100 can receive the signal from the host portion 200 and provide display or other functions for the normal operation of the user, and the host portion 200 can be placed in a pocket or other location. The structure of the hand-held portion 100 is relatively simple, so the hand-held portion 100 can be made extremely light and thin, and the electronic components of the hand-held portion 100 can be less, so the endurance of the hand-held portion 100 can be improved. A larger battery can be located in the host portion 200 to improve the endurance of the host portion 200 and avoid affecting the portability of the hand-held portion 100. The mobile terminal 10 can also be a tablet computer or a palmtop computer, etc.

In the embodiment shown in FIG. 3, the first installation slot 230 or the second installation slot 240 is a circumferential structure with an opening, namely, the first installation slot 230 can extends to entire the side surface 225 of the host portion 200, and the second installation slot 240 can also extends to entire the side surface 225 of the host portion 200. For example, the cross section of the first installation slot 230 may be approximately U-shaped, and the cross section of the second installation slot 240 may be approximately U-shaped. In one embodiment, as shown in FIG. 3, the host portion 200 includes a frame which defines the first installation slot 230 and the second installation slot 240. The frame includes a first side wall 226, a second side wall 227 substantially parallel to and spaced apart from the first side wall 226, and a first end wall 228 connecting the first side wall 226 and the second side wall 227. The frame is approximately U-shaped and has an opening 232. The first end wall 228 defines a room for accommodating the camera module 210, the second communication module, the third communication module, the second power supply module and the processor. The hand-held portion 100 can be installed into the first installation slot 230 from the side of the opening 232, so that the orientation of the display screen 120 is the same as that of the light incident surface 211. At this time, the camera module 210 can perform the function of the front camera, so as to facilitate self shooting, video calling, and other operations for the user. The hand-held portion 100 can also be installed into the second installation slot 240 from the side of the opening 232, so that the orientation of the camera module 210 is the same or opposite to that of the display screen 120. Taking the open structure of the first installation slot 230 as an example, the above structure enables the user to insert the hand-held portion 100 into the first installation slot 230 of the host portion 200 from the side of the side surface 225 of the host portion 200, and the groove wall of the first installation slot 230 can be used for guiding, so as to facilitate the insertion and removal of the hand-held portion 100.

Figure 4:
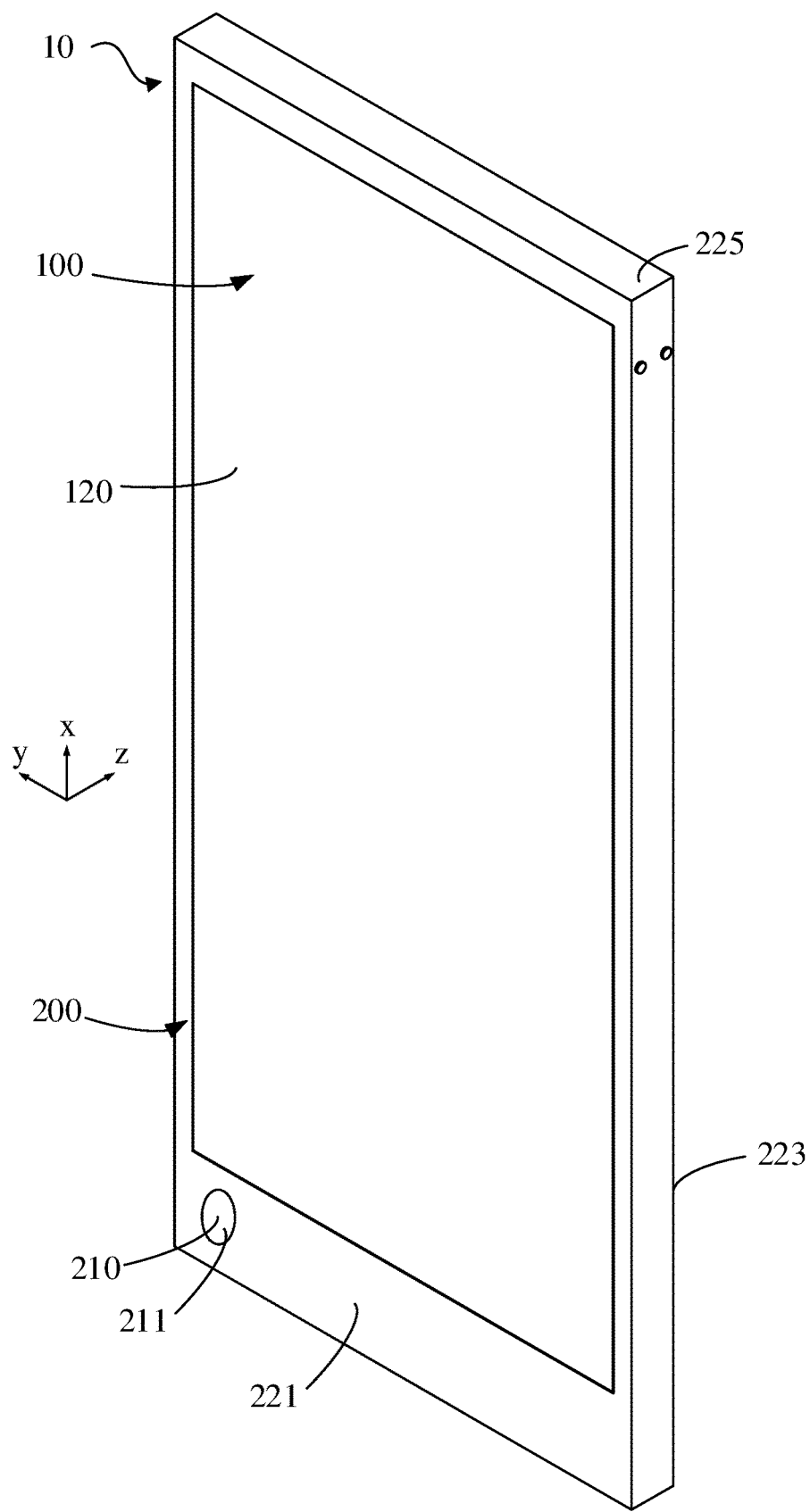
FIG. 4 is a stereogram of a mobile terminal in another embodiment.
Figure 5:
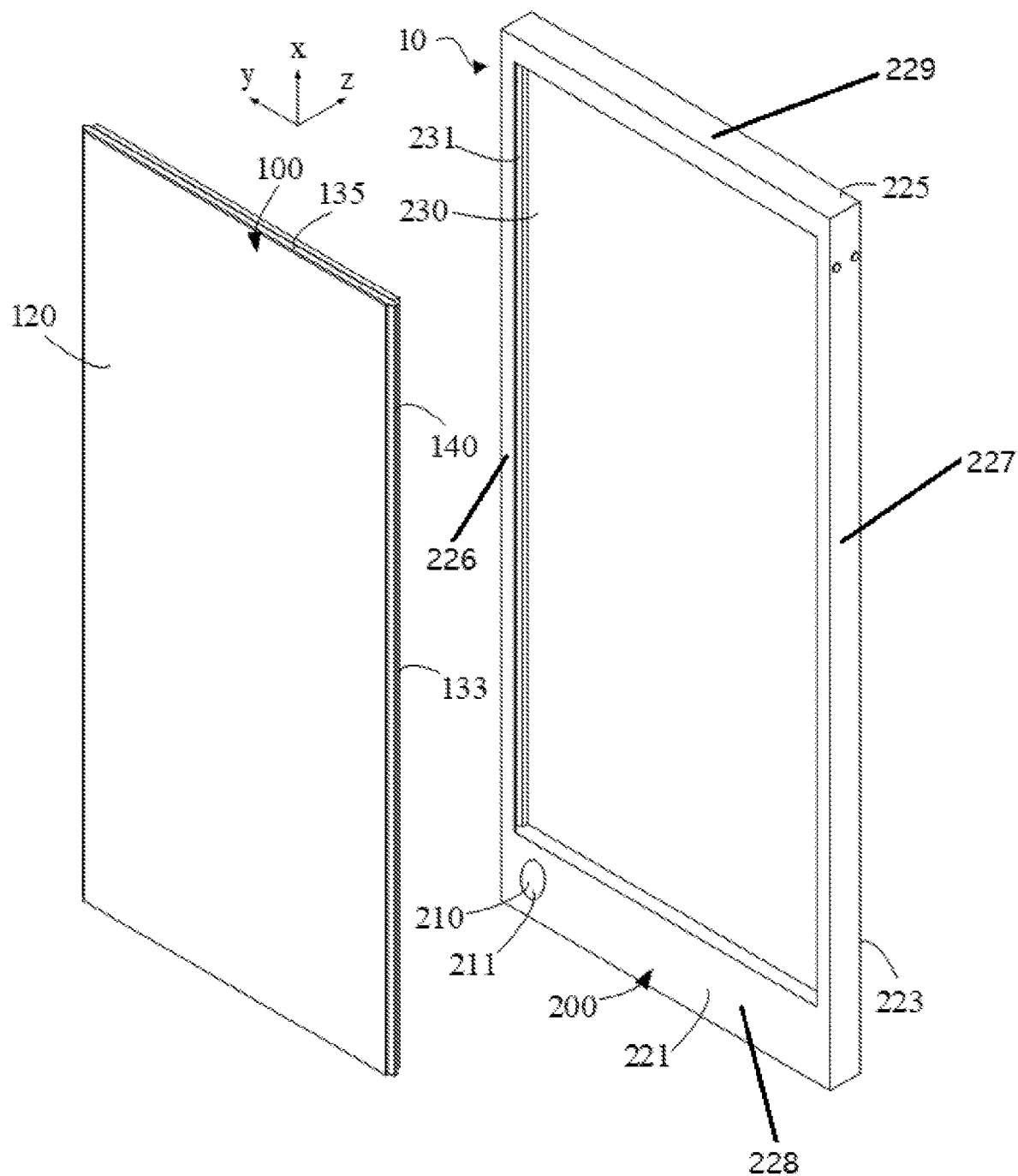
FIG. 5 is an exploded view of the mobile terminal shown in FIG. 4.

As illustrated in FIGS. 4 and 5, in one embodiment, the first installation slot 230 and the second installation slot 240 are in a circumferential closed structure. In one embodiment, as shown in FIG. 5, the host portion 200 includes a closed frame which defines the first installation slot 230 and the second installation slot 240. The frame includes a first side wall 226, a second side wall 227 substantially parallel to and spaced apart from the first side wall 226, a first end wall 228 connecting the first side wall 226 and the second side wall 227, and a second end wall 229 substantially parallel to and spaced apart from the first end wall 228 and connecting the first side wall 226 and the second side wall 227. In the embodiment shown in FIG. 4, the hand-held portion 100 can be installed into the first installation slot 230 from the side of the front surface 221 of the host portion 200, so that the orientation of the display screen 120 is the same as that of the light incident surface 211. At this time, the camera module 210 can perform the function of the front camera, so as to facilitate self shooting, video calling, and other operations for the user. The orientation of the display screen 120 refers to the orientation of the side of the display surface of the display screen 120. The display surface of the display screen 120 is a surface that the user can directly contact, the display surface can display information, and can provide an interactive interface for the user to touch, operate, etc. As illustrated in FIG. 5, the hand-held portion 100 can also be installed into the second installation slot 240 from the side of the back surface 223 of the host portion 200, so that the orientation of the display screen 120 is opposite to the orientation of the light incident surface 211. At this time, the camera module 210 may perform the function of a back camera to facilitate the user to perform operations such as picture shooting or video recording. The above mobile terminal 10 can avoid setting the camera module on both the front surface 221 and the back surface 223 of the host portion 200, thus reducing the number of components and saving the cost of the mobile terminal 10. Furthermore, the camera module 210 can have higher resolution, thus improving the quality of self shooting and back shooting.

Figure 6:
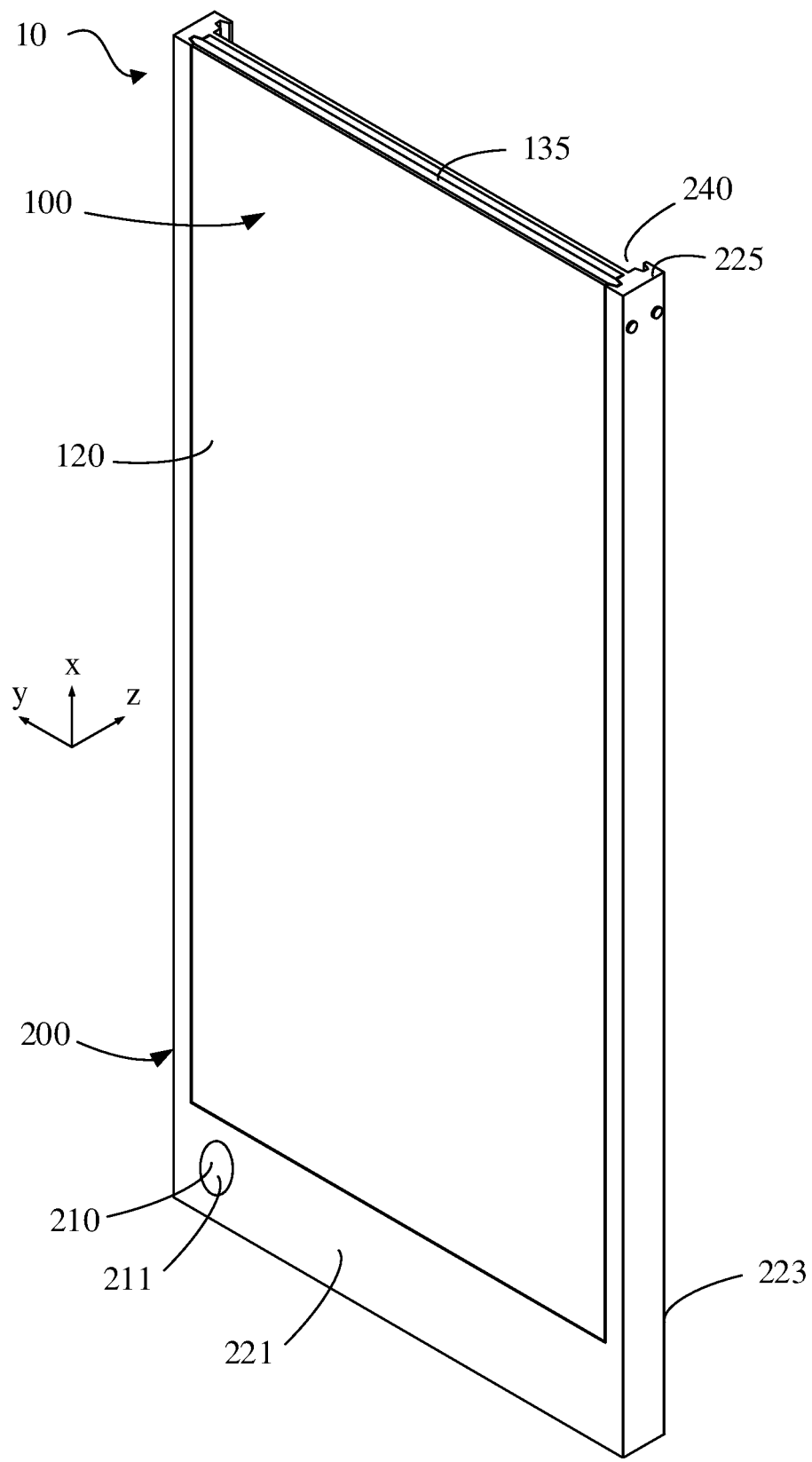
FIG. 6 is a stereogram along one view of a mobile terminal in another embodiment.
Figure 7:
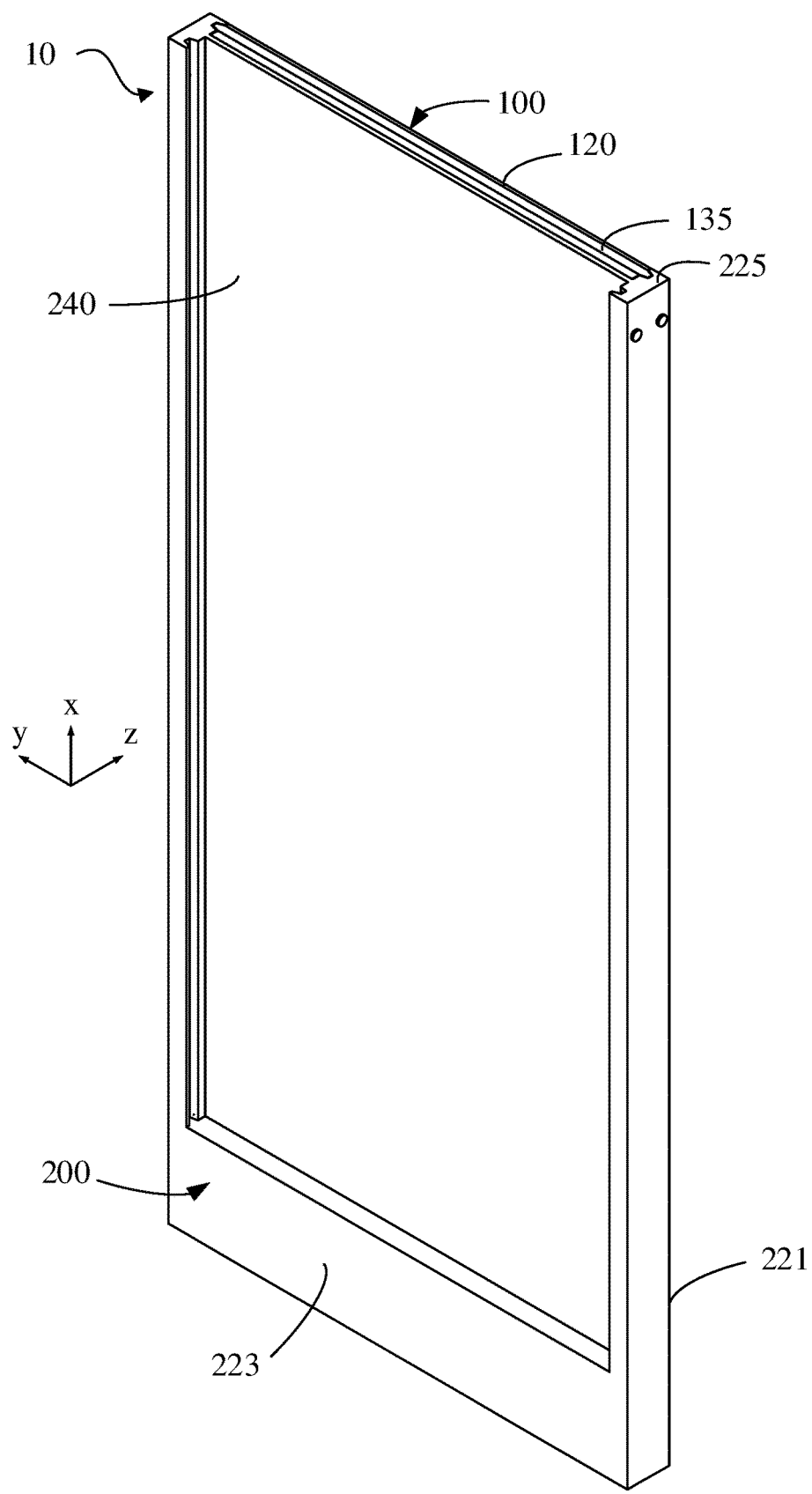
FIG. 7 is a stereogram along another view of the mobile terminal shown in FIG. 6.
Figure 8:
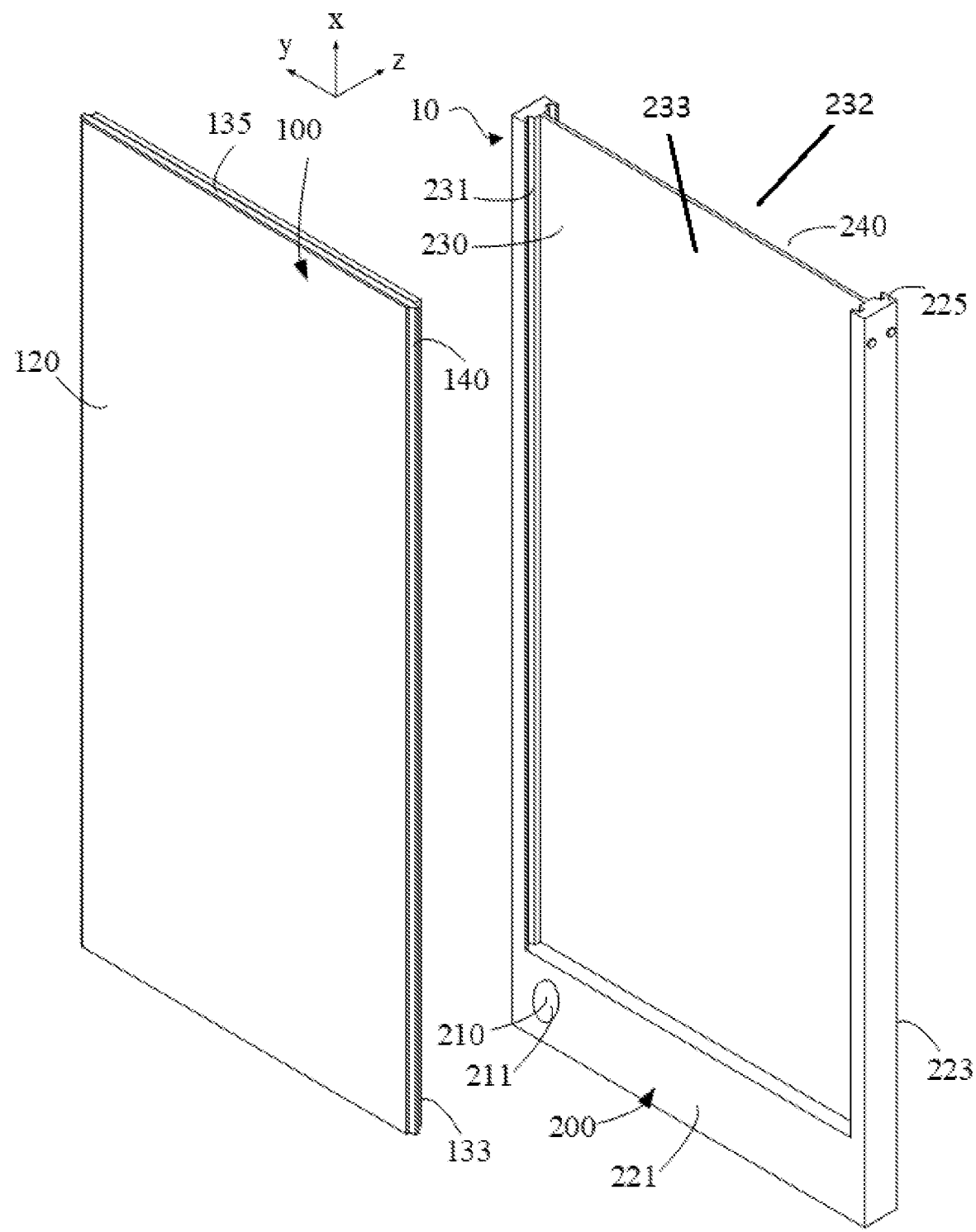
FIG. 8 is an exploded view of the mobile terminal shown in FIG. 6.

In the embodiment shown in FIG. 3, the first installation slot 230 and the second installation slot 240 are intercommunicated with each other so that the host portion 200 is hollow frame. The space of the first installation slot 230 and the second installation slot 240 penetrate the host portion 200 along a direction from the front surface 221 to the back surface 223. In one embodiment, the hand-held portion 100 can be installed into the first installation slot 230 from the side of the side surface 225, so that the orientation of the display screen 120 is opposite to the orientation of the light incident surface 211. Since the host portion 200 is hollow, the user can also view the information from the side of the back surface 223. At this time, the camera module 210 may perform the function of a back camera to facilitate the user to perform operations such as picture shooting or video recording. The hand-held portion 100 can also be installed into the second installation slot 240 from the side of the side surface 225, so that the orientation of the camera module 210 is the same or opposite to that of the display screen 120. As illustrated in FIGS. 6 to 8, in another embodiment, the first installation slot 230 and the second installation slot 240 are arranged on the opposite sides and are not intercommunicated with each other, that is, the first installation slot 230 and the second installation slot 240 are isolated by a baffle plate 233. The baffle plate 233 is located in the frame of the host portion 200 and parallel to and spaced from the front surface 221 and the back surface 223. The baffle plate 233 can be transparent and opaque. In one embodiment, the baffle plate 233 is a transparent glass plate. The baffle plate 233 and the frame of the host portion 200 can be in integrated structure, or the baffle plate 233 can be detachable from the frame of the host portion 200. In one embodiment, each of the inner surface of the first side wall 236 and the inner surface of the second side wall 237 can be provided with a groove which extends along the length direction (x-axis direction) of the host portion 200 and configured for receiving the baffle plate 233. The baffle plate 233 can be inserted in to the frame of the host portion 200 from the side of the opening 232 and along the grooves. When the hand-held portion 100 is installed into the first installation slot 230 from the side of the opening 232 so that the orientation of the display screen 120 is opposite to the orientation of the light incident surface 211, the baffle plate 233 of the host portion 200 shelter the display surface of the display screen 120, which can prevent the display surface from being exposed, thus preventing the display surface of the display screen 120 from being damaged by accidental collision. When the hand-held portion 100 can be installed into the second installation slot 240 from the side of the side surface 225 so that the orientation of the display screen 120 is the same as that of the light incident surface 211, the baffle plate 233 of the host portion 200 can also shelter the display surface of the display screen 120, prevent the display surface from being exposed, and thus prevent the display surface of the display screen 120 from being damaged by accidental collision.

Figure 9:
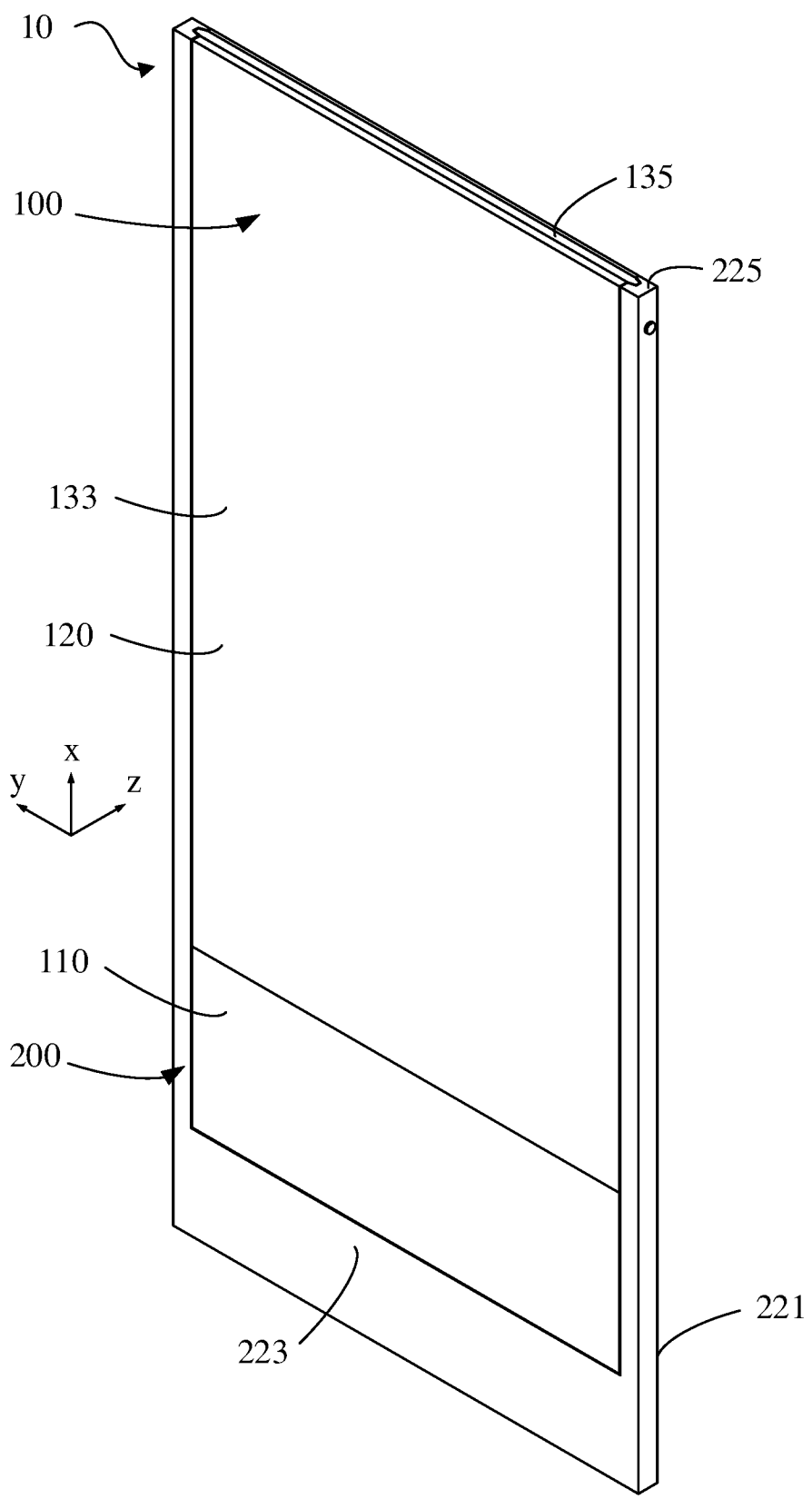
FIG. 9 is a stereogram along one view of a mobile terminal in another embodiment.
Figure 10:
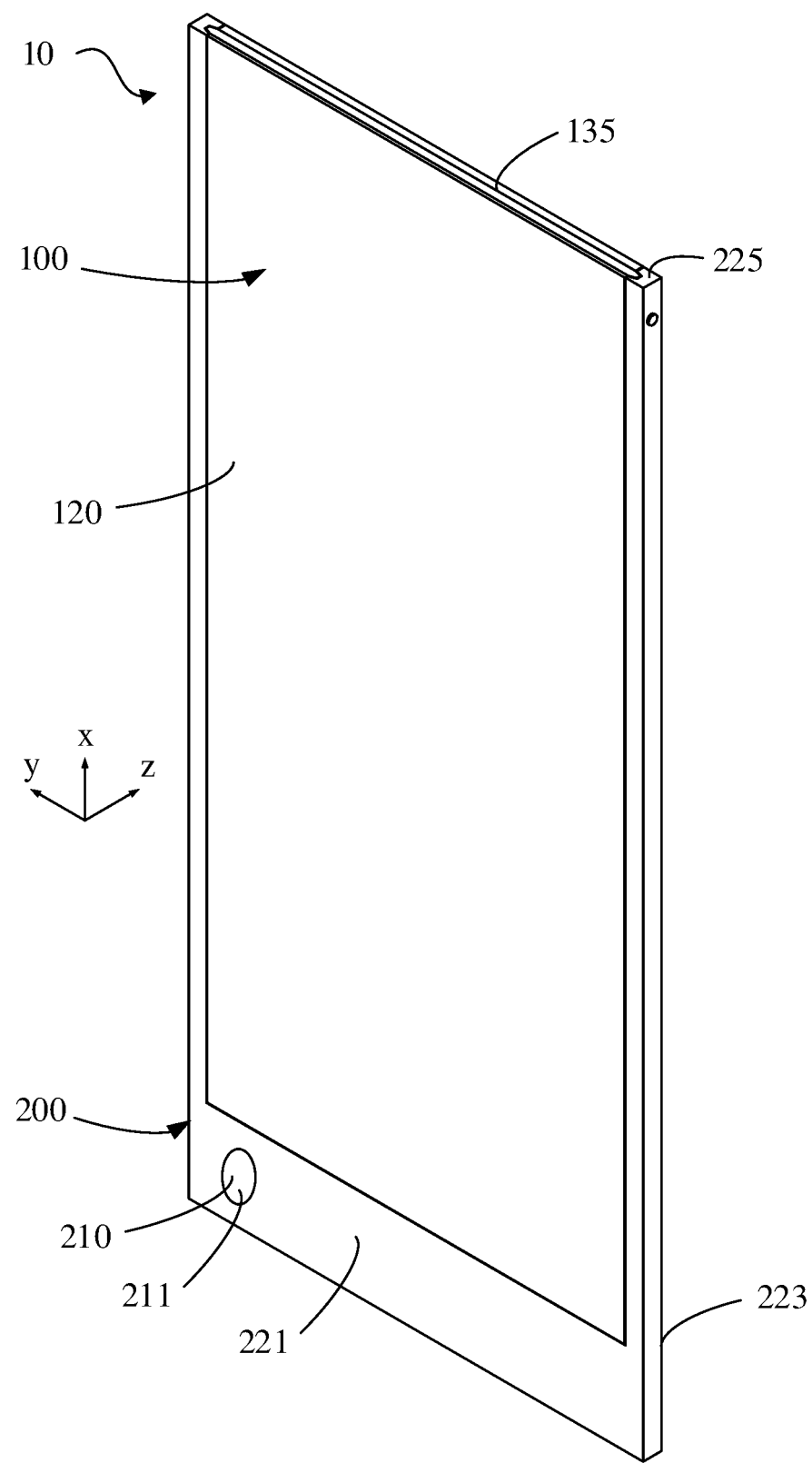
FIG. 10 is a stereogram along another view of the mobile terminal shown in FIG. 9.

As illustrated in FIG. 9 and FIG. 10, in one embodiment, the hand-held portion 100 is substantially a rectangular plate. As further illustrated in FIGS. 11 and 12, the first installation slot 230 may be used as the second installation slot 240. The hand-held portion 100 includes a front end surface 131, a back end surface 133 and a side end surface 135 connecting the front end surface 131 and the back end surface 133. The display screen 120 is arranged on the front end surface 131. The hand-held portion 100 can be installed into the first installation slot 230 from the side of the front end surface 131 and can also be installed into the first installation slot 230 from the side of the back end surface 133. Specifically, two sides of the hand-held portion 100 can be set as a symmetrical structure, and two sides of the first installation slot 230 can be set as a symmetrical structure correspondingly. In the operation process, the user can install the hand-held portion 100 into the host portion 200 with the front face 131 facing the host portion 200, or install the hand-held portion 100 into the host portion 200 with the back end surface 133 facing the host portion 200. On one hand, the orientation of the display screen 120 and the orientation of the light incident surface 211 can be arranged to be the same or opposite. On the other hand, it is unnecessary for the user to deliberately distinguish the front end surface 131 or the back end surface 133 of the hand-held portion 100, and the user can install the hand-held portion 100 into the host portion 200 with any one of the front end surface 131 and the back end surface 133 facing the host portion 200, thus facilitating the assembly of the hand-held portion 100 and the host portion 200, and improving the convenience for user to assemble.

The mobile terminal 10 can include two hand-held portions 100, one is arranged on the first installation slot 230 and the other one is arranged on the second installation slot 240, so that the host portion 200 has the function of double-sides display. The two hand-held portions 100 can be separated from the host portion 200 and can be operated independently, so that the two hand-held portions 100 can be operated by the same user or different users. The number of hand-held portions 100 can be more than three, corresponding the number of the first installation slot 230 and the second installation slot 240 can be more than three, and multiple hand-held portions 100 can be operated by the same user or different users. For example, a family can have a single host portion 200, but has multiple hand-held portions 100, so as to save the cost and improve the convenience for the family.

Figure 11:
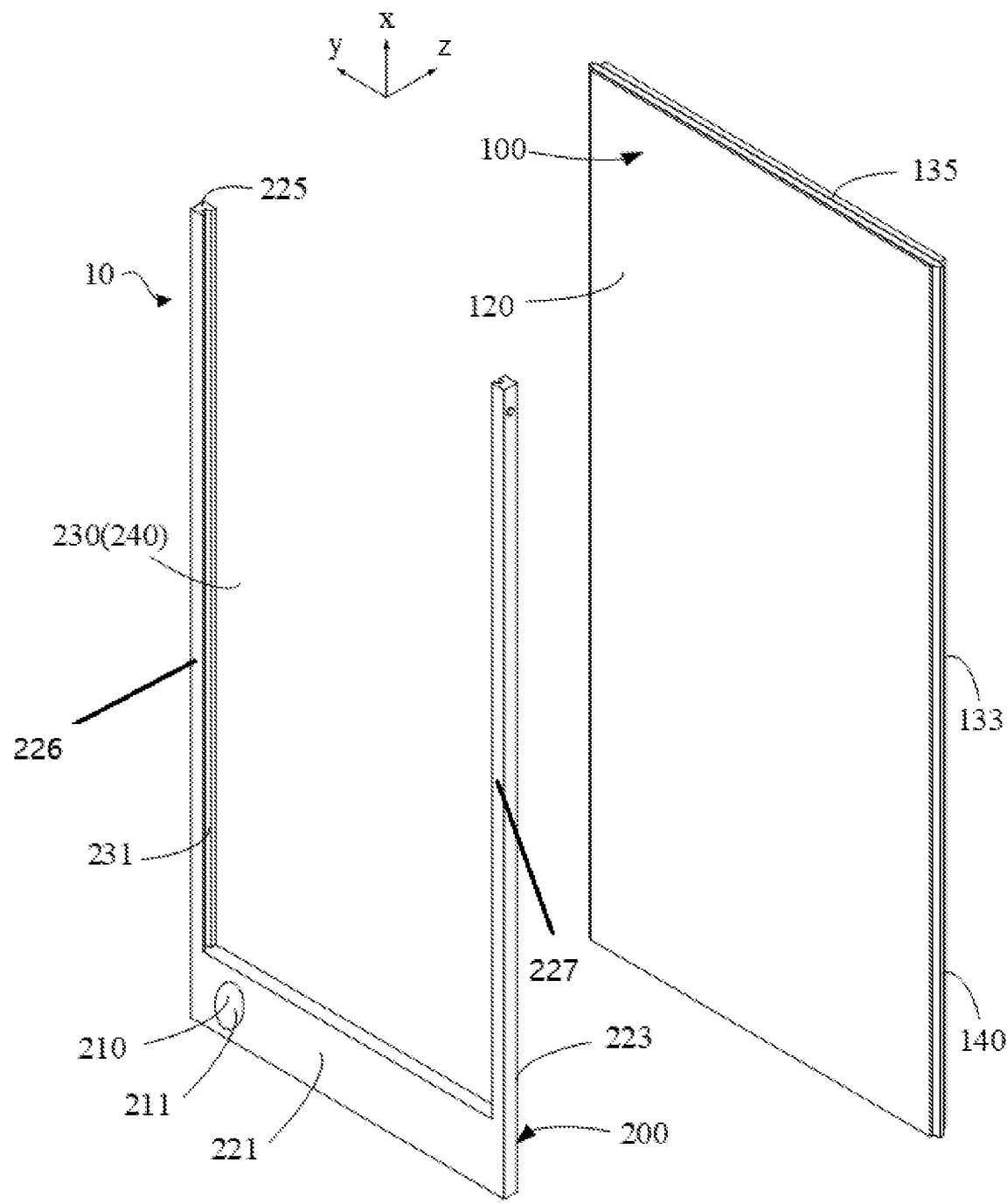
FIG. 11 is an exploded view of the mobile terminal shown in FIG. 9.
Figure 12:
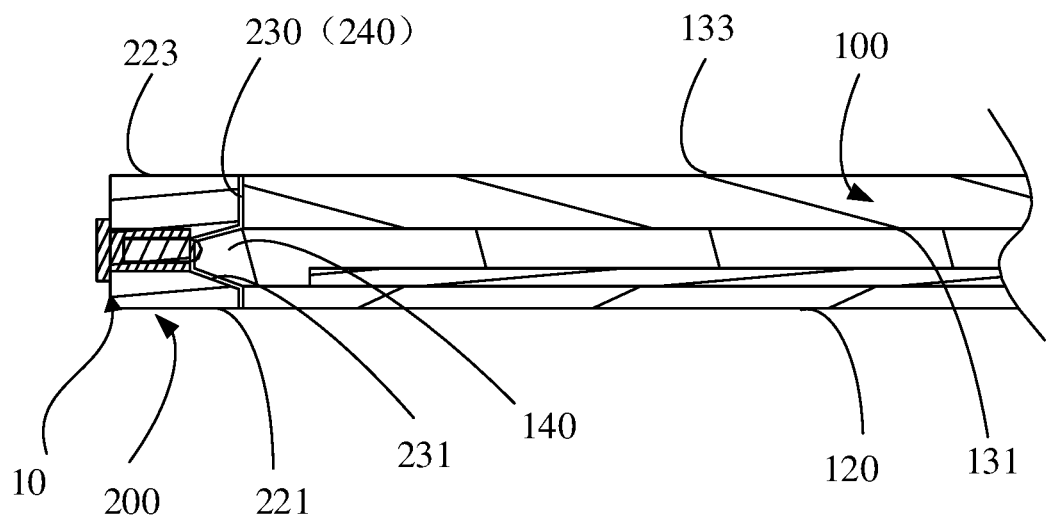
FIG. 12 is a cross sectional view of the mobile terminal shown in FIG. 10.

As illustrated in FIG. 11 and FIG. 12, the inner surface of the first side wall 236 and the inner surface of the second side wall 237 of the first installation slot 230 can be provided with a groove 231 which extends along the length direction (x-axis direction) of the host portion 200. The side surface of the hand-held portion 100 is provided with a guide rail 140 matchable to the groove 231, and the guide rail 140 can be accommodated in the groove 231. The outer circumference of the display screen 120 of the hand-held portion 100 can be provided with a metal or plastic support structure, and the guide rail 140 can be installed on the support structure, so that the guide rail 140 becomes a part of the hand-held portion 100. In the embodiment shown in FIG. 11, in a plane perpendicular to the length direction of the host portion 200, the cross section of the groove 231 is approximately trapezoid, and the cross section of the guide rail 140 is approximately trapezoid. The guide rail 140 and the groove 231 allow the host portion 200 to hold the two sides of the hand-held portion 100, so as to prevent the hand-held portion 100 from easily separating from the host portion 200.

In one embodiment, when the hand-held portion 100 is inserted into the first installation slot 230 and the orientation of the display screen 120 is the same as that of the light incident surface 211, the surface of the display screen 120 away from the back end surface 133 can be flush with the front surface 221 of the host portion 200, so as to improve the integration of the mobile terminal 10 and beautify the appearance of the mobile terminal 10. In one embodiment, when the hand-held portion 100 is inserted into the second installation slot 240 and the orientation of the display screen 120 is opposite to the orientation of the light incident surface 211, the surface of the display screen 120 away from the back end surface 133 can be flush with the back surface 223 of the host portion 200, so as to further improve the integration of the mobile terminal 10 and beautify the appearance of the mobile terminal 10.

Figure 13:
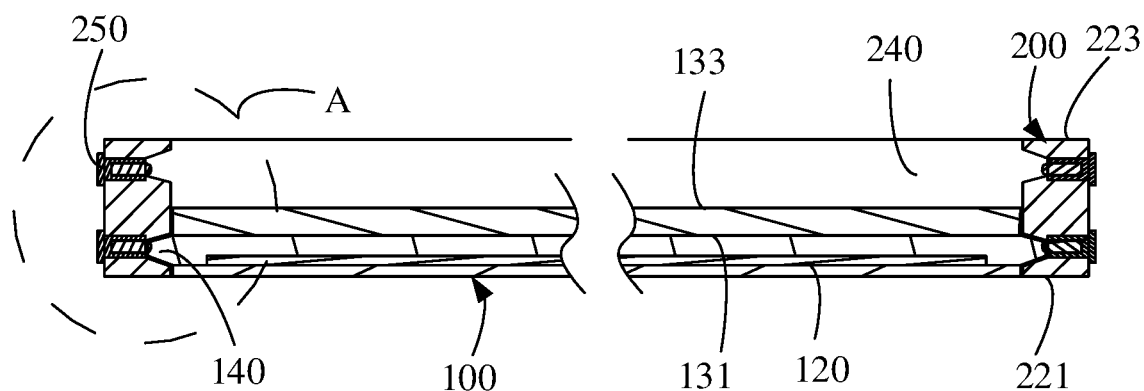
FIG. 13 is a cross sectional view of the mobile terminal shown in FIG. 1.
Figure 14:
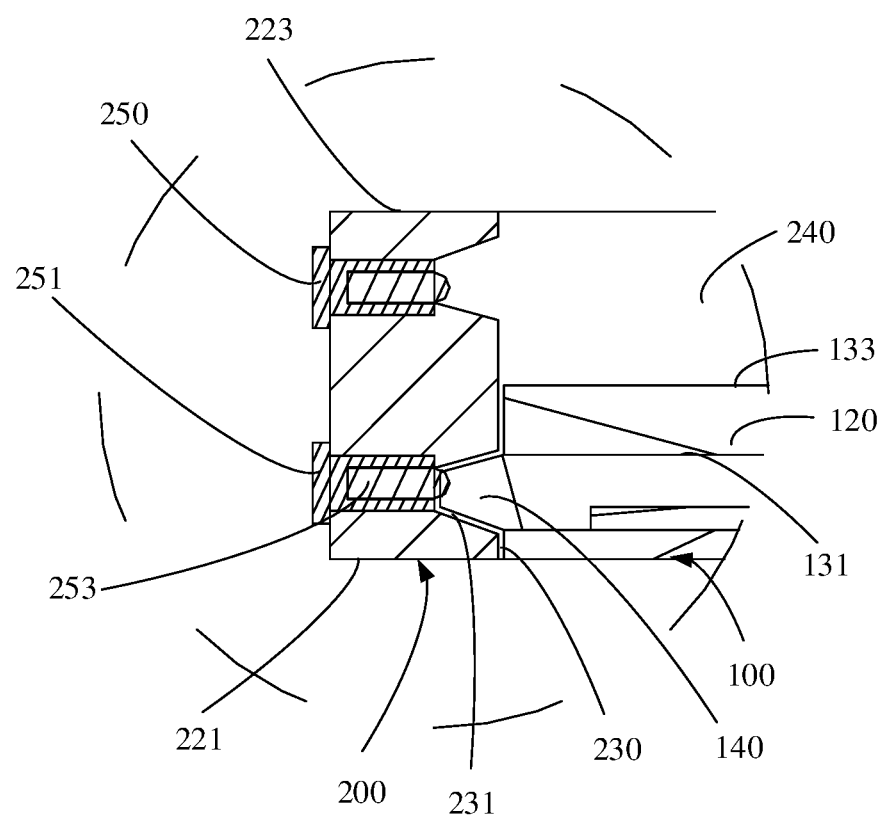
FIG. 14 is an enlarged schematic view of a portion A of the mobile terminal shown in FIG. 13.

As illustrated in FIG. 13 and FIG. 14, the mobile terminal 10 may also include an elastic unit 250 connected to the host portion 200, the elastic unit 250 protrudes from the groove 231. When the hand-held portion 100 is installed in the first installation slot 230, the elastic unit 250 can hold against the guide rail 140, so that the hand-held portion 100 is clamped in the first installation slot 230 of the host portion 200. Specifically, as illustrated in FIG. 14, in one embodiment, the elastic unit 250 includes a threaded fastener 251 and an elastic member 253, the threaded fastener 251 is connected to a host portion 200 by thread, the threaded fastener 251 is provided with a mounting hole, one end of the elastic member 253 is accommodated in the mounting hole, and the other end of the elastic member 253 is protruded out of the groove 231 and can hold against the guide rail 140. When the hand-held portion 100 is inserted into the first installation slot 230 of the host portion 200 through the cooperation of the guide rail 140 and the groove 231, the elastic member 253 is pressed to form an elastic deformation and produce pressure on the guide rail 140, so that the hand-held portion 100 can be firmly held along the width direction of the host portion 200. Thus, the hand-held portion 100 can be reliably fixed on the host portion 200, and the hand-held portion 100 can be prevented from easily separating from the host portion 200.

The elastic member 253 can be a spring extending along the width direction of the host portion 200. One end of the spring is accommodated in the mounting hole, and the other end of the spring protrudes out of the groove 231. In the process of inserting the hand-held portion 100 into the first installation slot 230, the spring can stretch and contract to form a deformation in the width direction of the host portion 200, so as to tightly fix the guide rail 140. In other embodiments, the elastic member 253 can also be a spring piece, or a silica gel column, or a plastic column, etc. with the same function, which will not be described here. Furthermore, in one embodiment, the number of elastic unit 250 can be more than one. In the width direction (Y-axis direction) of the host portion 200, at least one elastic unit 250 is located on one side of the host portion 200, and other elastic units 250 are located on the other side of the host portion 200. In one embodiment, each of two sides of the first installation slot 230 of the host portion 200 is connected to a single elastic unit 250, the elastic units 250 on two sides of the first installation slot 230 can apply a symmetrical force on the hand-held portion 100, so that the hand-held portion 100 can be smoothly inserted into the first installation slot 230 of the host portion 200. In other embodiments, different numbers of spring top components 250 can also be arranged on two sides of the first installation slot 230. The spring top components 250 are also conducive to the engagement of the hand-held portion 100 and the host portion 200. Only one side of the first installation slot 230 can be provided with the elastic unit 250, and the other side of the first installation slot 230 is not provided with the elastic unit 250. The elastic unit 250 is also conducive to the engagement of the hand-held portion 100 and the host portion 200, which will not be discussed in detail here. The elastic unit 250 can also be arranged on the second installation slot 240, so that when the hand-held portion 100 is installed in the second installation slot 240, an effective engagement can be formed between the host portion 200 and the hand-held portion 100, and the hand-held portion 100 is prevented from easily separating from the host portion 200.

In one embodiment, the hand-held portion 100 includes a rechargeable battery, the side wall of the hand-held portion 100 is provided with a charging interface, the side wall of at least one of the first installation slot 230 and the second installation slot 240 is provided with a discharge interface corresponding to the charging interface, and the host portion 200 can charge the hand-held portion 100 through the discharge interface and the charging interface. Specifically, when the hand-held portion 100 is inserted into the first installation slot 230, the discharge interface is matched with the charging interface, and the host portion 200 can charge the hand-held portion 100. The memory module of the hand-held portion 100 can be configured to store data, and the volume of the memory module can also be in a large size, so that the host portion 200 has a large data storage space. The host portion 200 may also include electronic components such as microprocessor, which is configured to control the work of electronic components such as the second communication module, the third communication module, and the memory module, etc., which will not be discussed in detail here.

In one embodiment, a liquid crystal display (LCD) screen can be used as the display screen 210 to display information. The LCD screen can be a thin film transistor (TFT) screen or in-plane switching (IPS) screen or splice liquid crystal display (SLCD) screen. In another embodiment, an organic light emitting diode (OLED) screen can be used as the display screen 210 to display information. The OLED screen can be an active matrix organic light emitting diode (AMOLED) screen, super AMOLED screen, or super AMOLED plus, which will not be described in detail here.

As illustrated in FIG. 15 to FIG. 21, the communication mode between the host portion and the hand-held portion is described, and the communication mode between the host portion and the external equipment is described.

Figure 15:
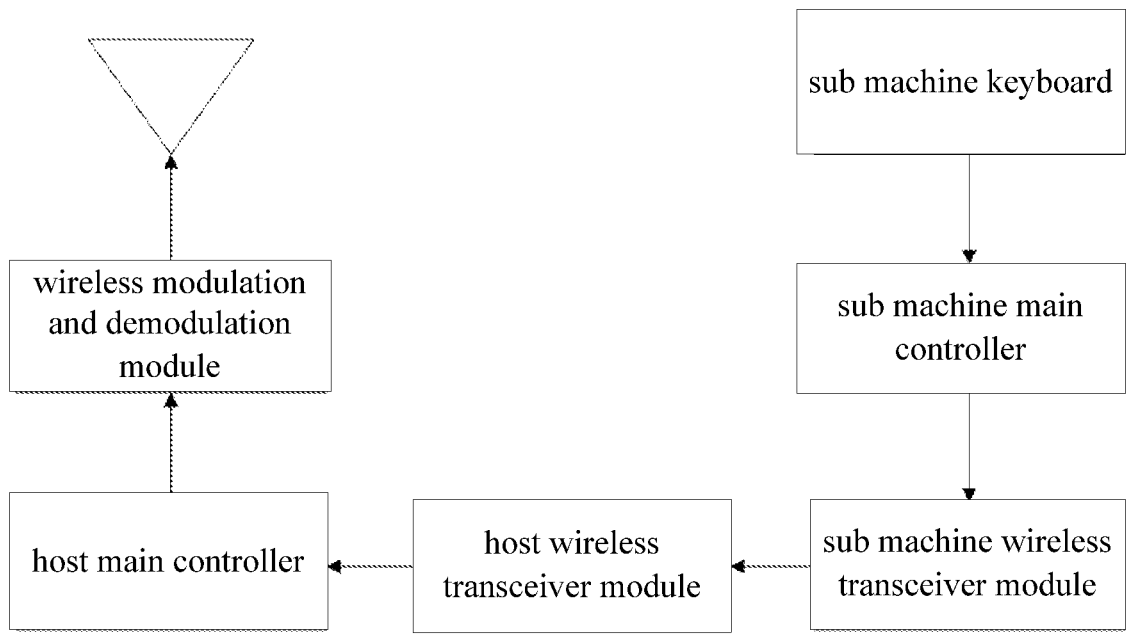
FIG. 15 is a flowchart of a mobile terminal in the first working state in one embodiment.
Figure 16:
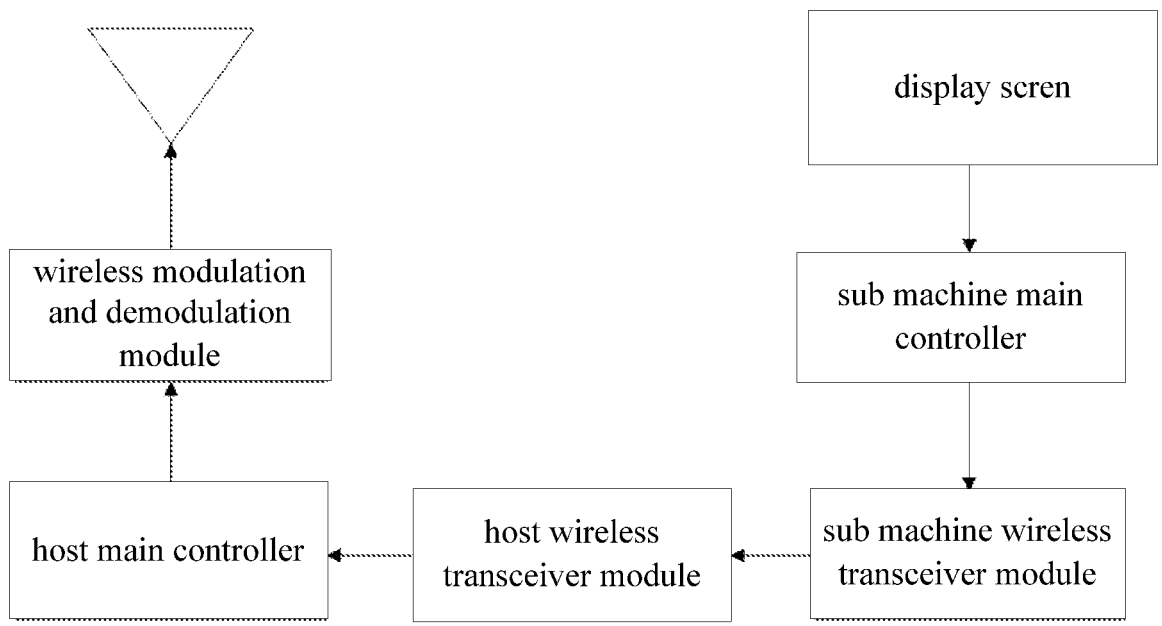
FIG. 16 is another flowchart of the mobile terminal in FIG. 15 in the first working state.

As illustrated in FIG. 15 and FIG. 16, in one embodiment, the host portion includes a wireless modulation and demodulation module, a host main controller, and a host wireless transceiver module. The hand-held portion includes sub machine keyboard, a sub machine main controller, and a sub machine wireless transceiver module. In the first working state of the mobile terminal, the control command output by the sub machine keyboard, under the control of the sub machine main controller, is modulated by the sub machine wireless transceiver module and sent to the host wireless transceiver module. Under the control of the host main controller, the control command is modulated by the wireless modulation and demodulation module and sent to the air. The signal of control command from the air, after being demodulated by the wireless modulation and demodulation module, is sent to the hand-held portion after being modulated by the host wireless transceiver module through the host main controller. After being received by the sub machine wireless transceiver module, the control command is displayed by the display screen under the control of the sub machine main controller. The sub machine keyboard can be a touch sub machine keyboard, or the sub machine keyboard can be realized through a display screen with touch control function. According to the above embodiments, the microprocessor of the host portion can include the host main controller, the first communication module can include the sub machine wireless transceiver module, the second communication module can include the host wireless transceiver module, and the third communication module can include the wireless modulation and demodulation module.

Figure 17:
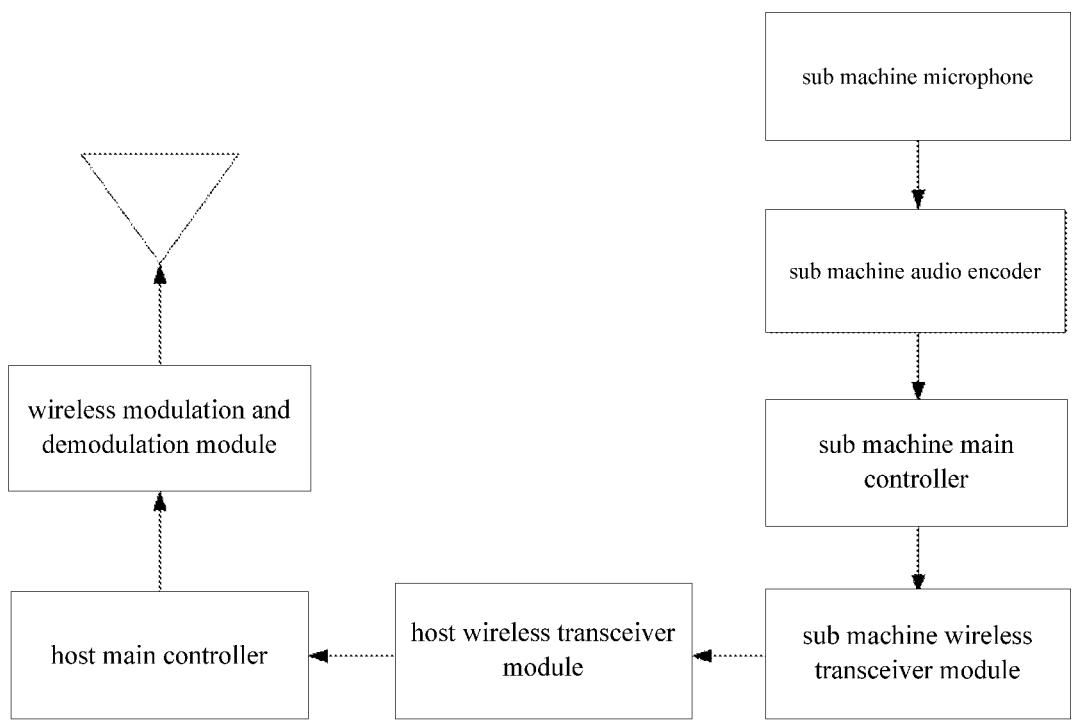
FIG. 17 is a flowchart of a mobile terminal in the second working state in one embodiment.
Figure 18:
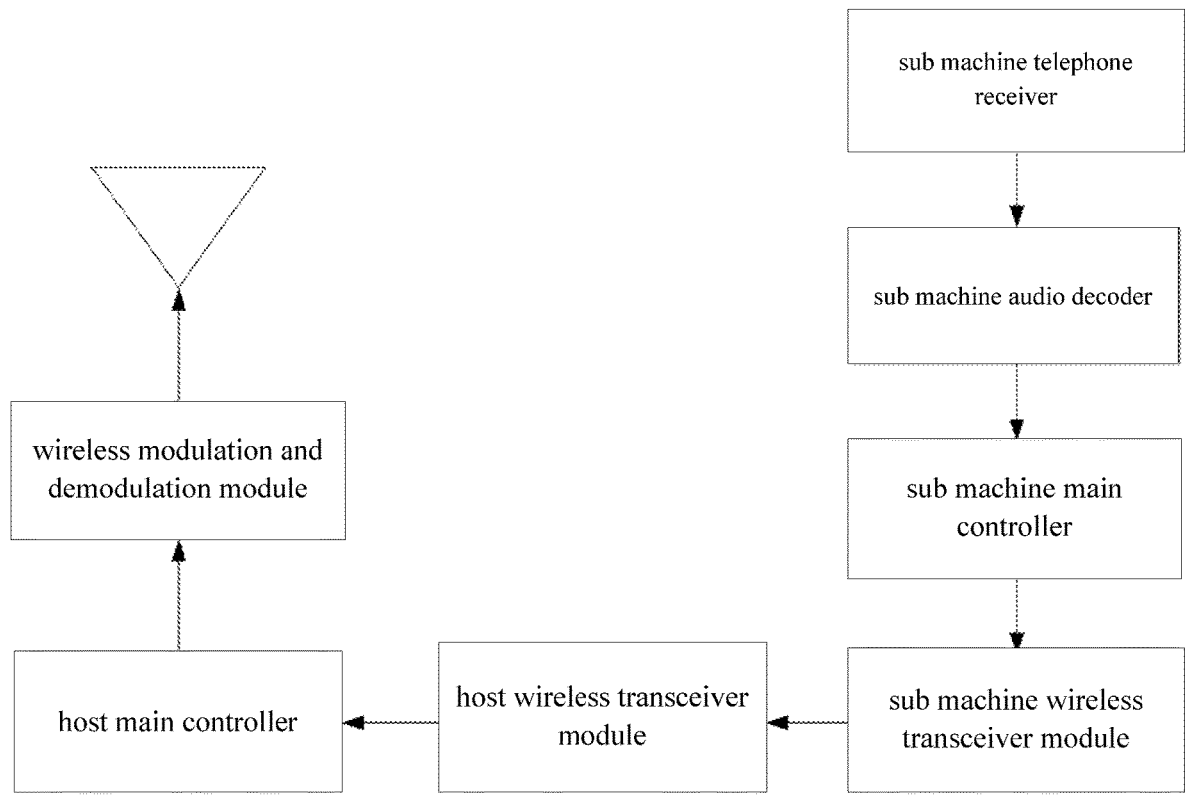
FIG. 18 is another flowchart of the mobile terminal in FIG. 17 in the second working state.

As illustrated in FIG. 17 and FIG. 18, in one embodiment, the host portion includes a wireless modulation and demodulation module, a host main controller, a host wireless transceiver module, and the hand-held portion includes a sub machine main controller, a sub machine microphone, a sub machine telephone receiver, an sub machine audio encoder, an sub machine audio decoder, and a sub machine wireless transceiver module capable of communicating with the host wireless transceiver module. In the second working state, the audio signal from the sub machine microphone is encoded by the sub machine audio encoder and then transmitted to the sub machine main controller. Under the control of the sub machine main controller, the audio signal is sent by the sub machine wireless transceiver module, and then received by the host wireless transceiver module. Under the control of the host main controller, the audio signal is transmitted to the wireless modulation and demodulation module, modulated by the wireless modulation and demodulation module, and sent to the air. The signal from the air is demodulated by the wireless modulation and demodulation module and transmitted to the host main controller. Under the control of the host main controller, the signal is transmitted to the host wireless transceiver module. After being modulated by the host wireless transceiver module, the signal is sent to the hand-held portion. The audio signal is demodulated by the sub machine wireless transceiver module, decoded by the sub machine audio decoder under the control of the sub machine main controller, and output by sub machine telephone receiver. The sub machine audio encoder can be an independent hardware unit, can also be integrated in the sub machine microphone, or can also be integrated in the sub machine main controller. The sub machine audio encoder can also have the function of audio decoding. The sub machine audio decoder can be an independent hardware unit, can also be integrated in the sub machine telephone receiver, or can also be integrated in the sub machine main controller. The sub machine audio decoder can also have the function of audio encoding.

Figure 19:
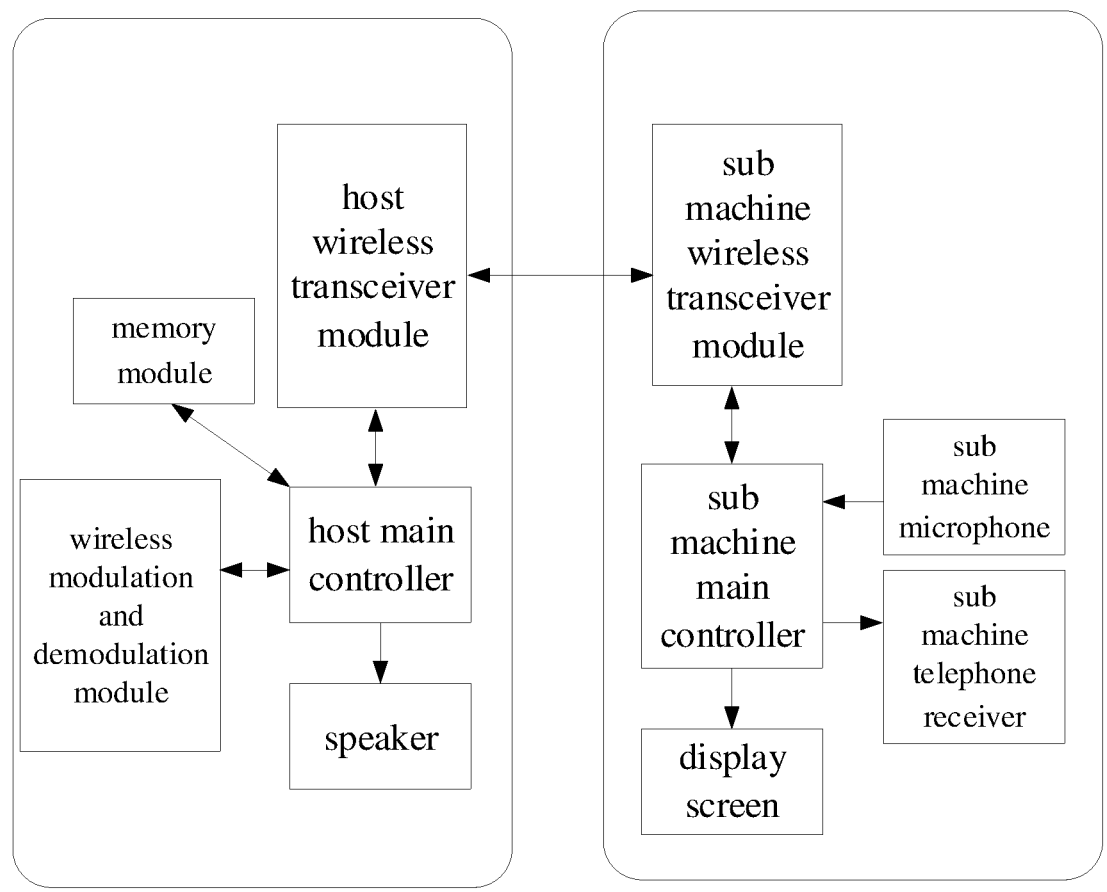
FIG. 19 is a block diagram of a mobile terminal in one embodiment.
Figure 20:
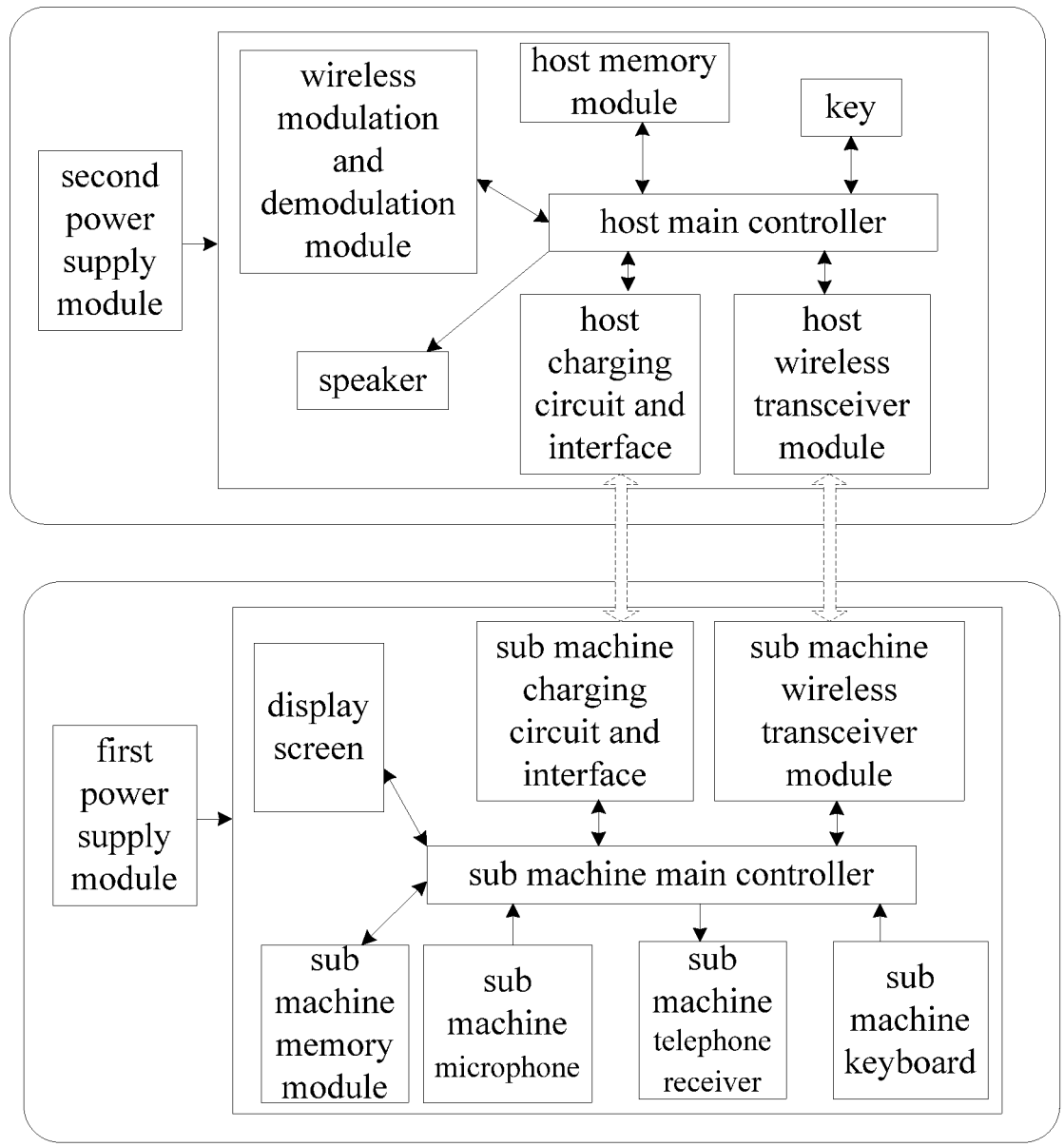
FIG. 20 is a block diagram of a mobile terminal in another embodiment.

As illustrated in FIG. 19 and FIG. 20, in one embodiment, the host portion includes a wireless modulation and demodulation module, a host main controller, and a host wireless transceiver module. The host main controller can communicate with the wireless modulation and demodulation module and the host wireless transceiver module. The hand-held portion includes the sub machine main controller, the sub machine wireless transceiver module which can communicate with the host wireless transceiver module. The sub machine main controller can communicate with the sub machine wireless transceiver module. The hand-held portion can access the communication network through the host portion. The host portion further includes a speaker, a key, a host memory module, and a host charging circuit and interface. The hand-held portion further includes a display screen, a sub machine memory module, and a sub machine charging circuit and interface.

Figure 21:
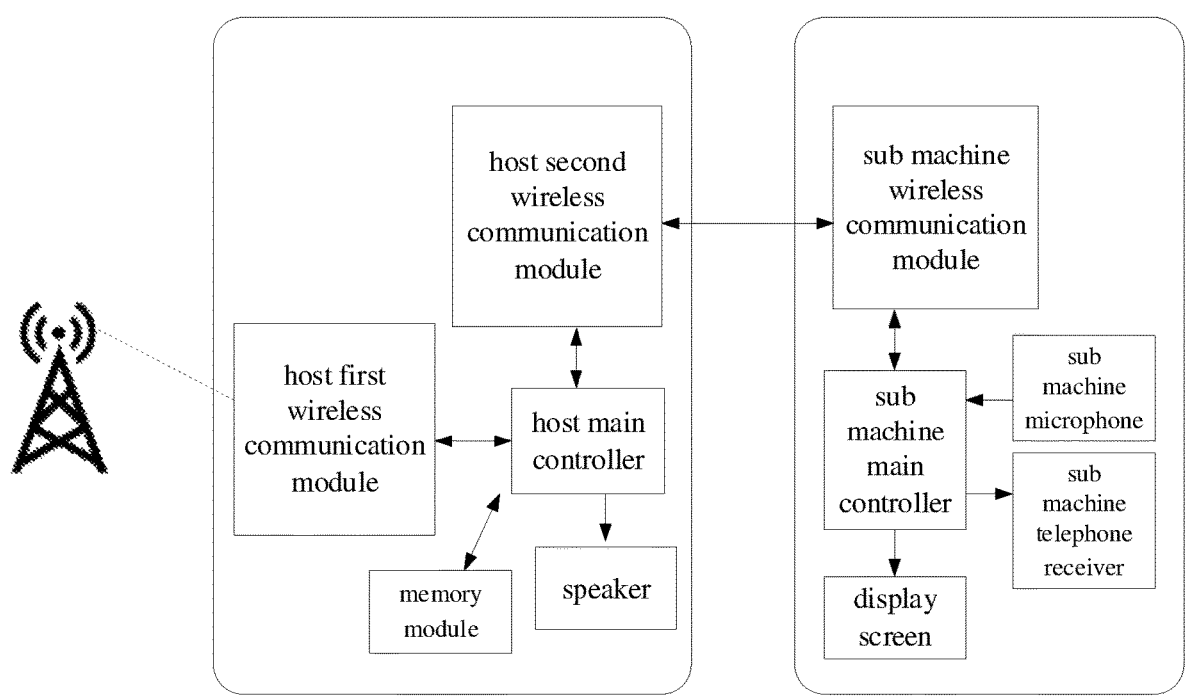
FIG. 21 is a block diagram of a mobile terminal in another embodiment.

Furthermore, as illustrated in FIG. 21, the host portion includes a host first wireless communication module, a host main controller and a host second wireless communication module, and the host main controller can communicate with the host first wireless communication module and the host second wireless communication module. The hand-held portion includes a sub machine main controller and a sub machine wireless communication module. The sub machine main controller can communicate with the sub machine wireless communication module, the sub machine wireless communication module can communicate with the host second wireless communication module, and the host first wireless communication module can communicate with the base station. In one embodiment, the host second wireless communication module and the sub machine wireless communication module are both low-power Bluetooth communication modules. In other embodiments, the host second wireless communication module and the sub machine wireless communication module can both be Wireless Fidelity (WiFi) communication modules.

The technical features of the above embodiments can be combined arbitrarily. In order to make the description concise, the above described embodiments are not all possible combinations of the technical features. However, as long as the combination of these technical features does not conflict, it should be considered as the scope of the description.

The above described embodiments only express several embodiments of the disclosure, the description of which is more specific and detailed, but it cannot be understood as the limitation of the scope of the disclosure. It should be pointed out that for those skilled in the art, without departing from the concept of the invention, a number of deformations and improvements can be made, which belong to the protection scope of the disclosure. Therefore, the scope of protection of the disclosure patent shall be subject to the appended claims.

Depending on the example embodiment, certain of the actions of methods described can be removed, others can be added, and the sequence of actions can be altered. It is also to be understood that the description and the claims drawn to a method may include some indication in reference to certain actions. However, the indication used is only to be viewed for identification purposes and not as a suggestion as to an order for the actions.

What is claimed is:

1. A mobile terminal comprising:
   a hand-held portion comprising a first communication module, a first power supply module, and a display screen; wherein the first power supply module is configured to be electrically connected to the first communication module and the display screen; and
   a host portion comprising a camera module, a second communication module, a third communication module, and a second power supply module; wherein the second power supply module is configured to be electrically connected to the camera module, the second communication module, and the third communication module; the third communication module is configured for communication with an external equipment; the host portion has a front surface, a back surface opposite to the front surface, and a side surface connecting the front surface and the back surface; the front surface is provided with a first installation slot, and the back surface is provided with a second installation slot; a portion of the front surface is used as a light incident surface for the camera module and allows light to pass through and enter the camera module; the hand-held portion is not only configured to be installed in the first installation slot, but also configured to be installed in the second installation slot; and the hand-held portion is detachable from the host portion, wherein the hand-held portion is detached from the host portion, and the second communication module is configured to be communicated with the first communication module.

2. The mobile terminal according to claim 1, wherein the hand-held portion is configured to be installed into the first installation slot from the side of the front surface, so that the orientation of the display screen is the same as that of the light incident surface; and the hand-held portion is further configured to be installed into the second installation slot from the side of the back surface, so that the orientation of the display screen is opposite to that of the light incident surface.

3. The mobile terminal according to claim 1, wherein the host portion comprises a U-shaped frame and defines an opening; the hand-held portion is not only configured to be installed in the first installation slot, but also configured to be installed in the second installation slot from the opening, so that the orientation of the display screen is same as or opposite to that of the light incident surface.

4. The mobile terminal according to claim 1, wherein the host portion comprises a frame which defines the first installation slot and the second installation slot, and a baffle plate located in the frame and parallel to and spaced from the front surface and the back surface; and
the first installation slot and the second installation slot are isolated by the baffle plate.

5. The mobile terminal according to claim 1, wherein the hand-held portion comprises a front end surface, a back end surface, and a side end surface connecting the front end surface and the back end surface; the display screen is located on the front end surface; and
the hand-held portion is configured to be installed into the first installation slot from the side of the front end surface or from the side of the back end surface.

6. The mobile terminal according to claim 1, wherein the host portion comprises a frame which defines the first installation slot and the second installation slot; and the first installation slot and the second installation slot are communicated so that the host portion is a hollow frame.

7. The mobile terminal according to claim 1, wherein the host portion comprises a frame which defines the first installation slot and the second installation slot; each of two opposite side walls of the frame is provided with a groove, the groove extends along a length direction of the host portion; and an edge of the hand-held portion is provided with a guide rail matchable to the groove, and the guide rail is configured to be accommodated in the groove.

8. The mobile terminal according to claim 7, further comprising an elastic unit connected to the host portion, the elastic unit protrudes out of the groove; and when the hand-held portion is installed into the first installation slot, the elastic unit is configured to hold the guide rail.

9. The mobile terminal according to claim 8, wherein the elastic unit comprises a threaded fastener and an elastic member; and the threaded fastener is connected to the host portion by thread, the threaded fastener is provided with a mounting hole, one end of the elastic member is accommodated in the mounting hole, and the other end of the elastic member is protruded out of the groove.

10. The mobile terminal according to claim 8, further comprising a plurality of elastic units; along a width direction of the host portion, at least one of the plurality of elastic units is located on one side of the host portion, and the rest of the plurality of elastic units are located on the other side of the host portion.

11. The mobile terminal according to claim 1, wherein the first power supply module comprises a nuclear battery, the nuclear battery is configured to be electrically connected to the first communication module and the display screen; the hand-held portion is also provided with a charging interface, a side wall of at least one of the first installation slot and the second installation slot is provided with a discharging interface corresponding to the charging interface, and the host portion is configured to charge the hand-held portion through the discharging interface and the charging interface; and the first communication module and the second communication module are both Bluetooth communication modules, or both are WiFi communication modules, or both are ZigBee communication modules, or both are NFC communication modules.

12. A mobile phone comprising:
a hand-held portion comprising a first communication module, a first power supply module and a display screen; and the first power supply module is configured to supply power for the first communication module and the display screen; and
a host portion comprising a second communication module, a third communication module, and a second power supply module; the second power supply module is configured to supply power for the second communication module and the third communication module; and
the third communication module is configured for communication with an external equipment;
the host portion has a front surface, a back surface opposite to the front surface, and a side surface connecting the front surface and the back surface; the front surface is provided with a first installation slot, and the back surface is provided with a second installation slot; the hand-held portion is not only configured to be installed in the first installation slot, but also configured to be installed in the second installation slot; and the hand-held portion is detachable from the host portion, wherein the hand-held portion is detached from the host portion, the second communication module is configured to be communicated with the first communication module.

13. The mobile phone according to claim 12, wherein the host portion comprises a camera module, and a portion of the front surface is used as a light incident surface for the camera module and allows light from environment to pass through and enter the camera module.

14. The mobile phone according to claim 12, wherein the hand-held portion is configured to be installed into the first installation slot from the side of the front surface, so that the orientation of the display screen is the same as that of the front surface; and the hand-held portion is further configured to be installed into the second installation slot from the side of the back surface, so that the orientation of the display screen is same as that of the back surface.

15. The mobile phone according to claim 12, wherein the host portion comprises a U-shaped frame and defines an opening; and the hand-held portion is not only configured to be installed in the first installation slot, but also configured to be installed in the second installation slot from the opening, so that the orientation of the display screen is same as or opposite to that of the front surface.

16. The mobile phone according to claim 12, wherein the host portion comprises a frame which defines the first installation slot and the second installation slot; each of two opposite side walls of the frame is provided with a groove, an edge of the hand-held portion is provided with a guide rail matchable to the groove; the mobile phone further comprises an elastic unit, the elastic unit is located in and protrudes out of the groove; and when the hand-held portion is installed into the first installation slot, the guide rail is received in the groove, and the elastic unit is configured to hold the guide rail.

17. The mobile phone according to claim 16, wherein the elastic unit comprises a threaded fastener and an elastic member; the threaded fastener is connected to the host portion by thread, and the threaded fastener is provided with a mounting hole; and one end of the elastic member is accommodated in the mounting hole, and the other end of the elastic member is protruded into the groove.

18. The mobile phone according to claim 12, wherein, the hand-held portion comprises a sub machine keyboard, a sub machine main controller, and a sub machine wireless transceiver module; the first power supply module is configured to supply power for the sub machine keyboard, the sub machine main controller and the sub machine wireless transceiver module; the host portion comprises a wireless modulation and demodulation module, a host main controller, and a host wireless transceiver module; the second power supply module is configured to supply power for the wireless modulation and demodulation module, the host main controller and the host wireless transceiver module; in a first working state of the mobile phone, a control command output by the sub machine keyboard, under the control of the sub machine main controller, is modulated by the sub machine wireless transceiver module and sent to the host wireless transceiver module; under the control of the host main controller, the control command is modulated by the wireless modulation and demodulation module and sent to the air;

signal of the control command from the air, after being demodulated by the wireless modulation and demodulation module, is sent to the hand-held portion after being modulated by the host wireless transceiver module through the host main controller; and after being received by the sub machine wireless transceiver module, the control command is displayed by the display screen under the control of the sub machine main controller.

19. The mobile phone according to claim 12, wherein the hand-held portion comprises a sub machine main controller, a sub machine microphone, a sub machine telephone receiver, a sub machine audio encoder, a sub machine audio decoder, and a sub machine wireless transceiver module capable of communicating with a host wireless transceiver module; the first power supply module is configured to supply power for the sub machine main controller, the sub machine microphone, the sub machine telephone receiver, the sub machine audio encoder, the sub machine audio decoder, and the sub machine wireless transceiver module; the host portion comprises a wireless modulation and demodulation module, a host main controller, and the host wireless transceiver module; the second power supply module is configured to supply power for the wireless modulation and demodulation module, the host main controller, and the host wireless transceiver module; in a second working state, the audio signal from the sub machine microphone is encoded by the sub machine audio encoder and transmitted to the sub machine main controller; under the control of the sub machine main controller, the audio signal is sent by the sub machine wireless transceiver module, and received by the host wireless transceiver module; under the control of the host main controller, the audio signal is transmitted to the wireless modulation and demodulation module, modulated by the wireless modulation and demodulation module, and sent to the air; signal from the air is demodulated by the wireless modulation and demodulation module and transmitted to the host main controller; under the control of the host main controller, the signal is transmitted to the host wireless transceiver module; and after being modulated by the host wireless transceiver module, the signal is sent to the hand-held portion; the audio signal is demodulated by the sub machine wireless transceiver module, decoded by the sub machine audio decoder under the control of the sub machine main controller, and output by sub machine telephone receiver.

20. An electronic device comprising:
a hand-held terminal comprising a first communication module, a first power supply module, and a display screen; and
a host terminal comprising a camera module, a second communication module, a third communication module, and a second power supply module; wherein the second communication module is configured for communication with the first communication module; the third communication module is configured for communication with an external equipment; the host terminal has a front surface, a back surface opposite to the front surface, and a side surface connecting the front surface and the back surface; the front surface of the host terminal is provided with a first installation slot, and the back surface of the host terminal is provided with a second installation slot the hand-held terminal is not only configured to be installed in the first installation slot but is also configured to be installed in the second installation slot and the hand-held terminal is detachable from the host terminal and is free of a display screen; wherein when the hand-held terminal is separated from the host terminal, the second communication module is configured to be communicated with the first communication module.

* * * * *